(12) United States Patent
Mitsufuji et al.

(10) Patent No.: US 9,711,161 B2
(45) Date of Patent: Jul. 18, 2017

(54) VOICE PROCESSING APPARATUS, VOICE PROCESSING METHOD, AND PROGRAM

(71) Applicant: SONY CORPORATION, Tokyo (JP)

(72) Inventors: Yuhki Mitsufuji, Tokyo (JP); Toru Chinen, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 14/455,070

(22) Filed: Aug. 8, 2014

(65) Prior Publication Data

US 2015/0058015 A1 Feb. 26, 2015

(30) Foreign Application Priority Data

Aug. 20, 2013 (JP) .................................. 2013-170504

(51) Int. Cl.
*G10L 21/007* (2013.01)
*G10L 21/003* (2013.01)
G10L 21/013 (2013.01)
G10L 25/60 (2013.01)
G10L 17/04 (2013.01)

(52) U.S. Cl.
CPC ............ *G10L 21/003* (2013.01); *G10L 17/04* (2013.01); *G10L 25/60* (2013.01); *G10L 2021/0135* (2013.01)

(58) Field of Classification Search
CPC ....... G10L 15/22; G10L 13/033; G10L 17/00; G10L 17/26; G10L 2021/0135; G10L 25/78; G10L 17/14; G10L 13/027; G10L 13/04; G10L 15/065; G10L 15/07; G10L 15/30; G10L 17/005; G10L 15/08; G10L 15/14

USPC ........ 704/275, 246, 250, E15.007, 200, 231, 704/239, 243, E13.004, E17.002, E15.001
See application file for complete search history.

(56) References Cited

U.S. PATENT DOCUMENTS

| | | | | |
|---|---|---|---|---|
| 6,330,428 B1 * | 12/2001 | Lewis | ................ | H04B 7/18513 455/423 |
| 7,778,831 B2 * | 8/2010 | Chen | ..................... | G10L 15/065 704/207 |
| 8,010,358 B2 * | 8/2011 | Chen | ..................... | G10L 15/065 704/207 |
| 8,370,132 B1 * | 2/2013 | Conway | .............. | H04L 41/5067 370/232 |
| 2007/0061413 A1 * | 3/2007 | Larsen | .................... | A63F 13/10 709/217 |
| 2008/0281595 A1 * | 11/2008 | Sakai | .................... | G10L 15/142 704/250 |

(Continued)

FOREIGN PATENT DOCUMENTS

JP   2008-058696 A   3/2008

*Primary Examiner* — Marivelisse Santiago Cordero
*Assistant Examiner* — Stephen Brinich
(74) *Attorney, Agent, or Firm* — Chip Law Group

(57) ABSTRACT

A voice processing apparatus includes a voice quality determining unit configured to determine a target speaker determining method used for a voice quality conversion in accordance with a determining method control value for instructing the target speaker determining method of determining a target speaker whose voice quality is targeted to the voice quality conversion, and determine the target speaker in accordance with the target speaker determining method.

11 Claims, 11 Drawing Sheets

(56) References Cited

U.S. PATENT DOCUMENTS

2010/0086107 A1* 4/2010 Tzruya ................ H04M 3/2281
379/88.01

2014/0350925 A1* 11/2014 Park ........................ G10L 15/22
704/231

* cited by examiner

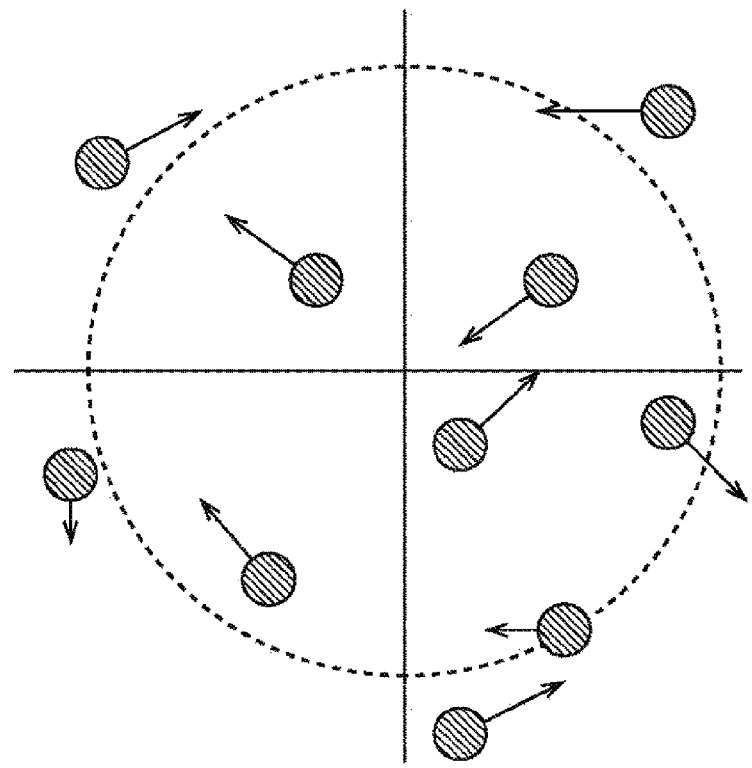
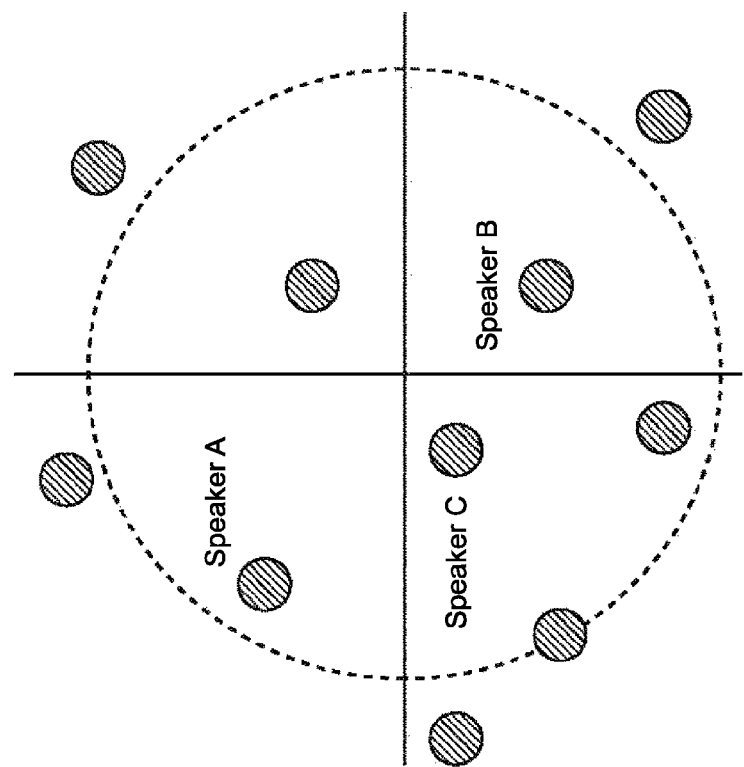
FIG.5

VOICE PROCESSING APPARATUS, VOICE PROCESSING METHOD, AND PROGRAM

CROSS REFERENCE TO RELATED APPLICATIONS

This application claims the benefit of Japanese Priority Patent Application JP 2013-170504 filed Aug. 20, 2013, the entire contents of each which are incorporated herein by reference.

BACKGROUND

The present technology relates to a voice processing apparatus, a voice processing method, and a program, and more particularly to a voice processing apparatus, a voice processing method, and a program which are capable of easily performing a voice quality conversion desired by a user, for example.

In recent years, a study has been made on a lifelog for continuing to record an individual's life for a long time using a wearable camera and a microphone.

In addition to a voice of a user wearing an apparatus, a voice of other person is sometimes mixed in the microphone. In this case, in addition to the voice of the user, the voice of the other person is also recorded in the lifelog.

On the assumption that the user publically opens the lifelog in the practical use of the lifelog, it is not suitable, from a viewpoint of privacy protection, that the voice of the other person recorded in the lifelog is publically opened as it is without processing.

As a method of protecting other person's privacy, there is a method of erasing the other person's voice from the lifelog.

However, for example, when a conversation between the user and the other person has been recorded in the lifelog, erasing only the other person's voice makes the conversation unnatural (or the conversation is not established), which sometimes makes a significance of the lifelog ineffective.

Therefore, as the method of privacy protection, there have been increased demands for a personality erasing method of erasing only the other person's personality while processing the voice and retaining context information of the conversation. An example of the personality erasing method of a voice includes a voice quality conversion for converting a voice quality of the voice.

For example, Japanese Patent Application Laid-Open No. 2008-058696 describes a technology that without having conversion coefficients for a voice quality conversion corresponding to the number of pairs of a reference speaker whose voice quality is to be converted and a target speaker whose voice quality is targeted to a voice quality conversion in conversion of a voice quality, a voice of at least one of the one or plurality of reference speakers and target speakers is used to conduct learning for generating a voice quality conversion model, and a predetermined adapting method is used to adapt the voice quality conversion model to the voice of at least one of an arbitrary reference speaker and an arbitrary target speaker, and the voice of the arbitrary or specified reference speaker is converted into the voice of the voice quality of the specified or arbitrary target speaker.

SUMMARY

Meanwhile, for example, there are cases where, in the voice quality conversion of the voice such as a conversation described above, the user desires to perform the voice quality conversion so as to still retain an atmosphere of the conversational situations or desires not to do so, and cases where, even in the voice quality conversion so as to still retain the atmosphere of the conversational situations, the user desires to perform the voice quality conversion so as to still retain personality to some extent or erase personality as much as possible.

However, it is difficult to constitute a user interface I/F capable of instructing (the voice quality of) the target speaker so as to perform the voice quality conversion desired by the user as described above. Moreover, if (the voice quality of) the target speaker is simply instructed, it is not always possible to perform the voice quality conversion desired by the user.

The present technology has been conceived in view of the above-described circumstances so that the voice quality conversion desired by the user can be facilitated.

According to an embodiment of the present technology, there is provided a voice processing apparatus including a voice quality determining unit configured to determine a target speaker determining method used for a voice quality conversion in accordance with a determining method control value for instructing the target speaker determining method of determining a target speaker whose voice quality is targeted to the voice quality conversion, and determine the target speaker in accordance with the target speaker determining method, or there is provided a program that causes a computer to function as the voice processing apparatus.

A voice processing method according to an embodiment of the present technology includes determining a target speaker determining method used for a voice quality conversion in accordance with a determining method control value for instructing the target speaker determining method of determining a target speaker whose voice quality is targeted to the voice quality conversion, and determining the target speaker in accordance with the target speaker determining method.

According to the embodiments of the present technology, a target speaker determining method used for a voice quality conversion is determined in accordance with a determining method control value for instructing a target speaker determining method of determining the target speaker whose voice quality is targeted to the voice quality conversion, and the target speaker is determined in accordance with the target speaker determining method.

It should be noted that the voice processing apparatus may be an independent apparatus, or an internal block constituting one apparatus.

Moreover, the program can be provided through transmission via a transmission medium or registration on a recording medium.

According to an embodiment of the present technology, it is possible to facilitate the voice quality conversion desired by the user.

It should be noted that the present technology is not limited to the effects described here and may achieve any one of the effects described in the present disclosure.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram describing an overview of a first determining method among target speaker determining methods;

DETAILED DESCRIPTION OF EMBODIMENTS

Hereinafter, an embodiment of the present disclosure will be described with reference to the drawings.

<An Embodiment of Voice Personality Erasing Apparatus to which the Present Technology is Applied>

Figure 1:
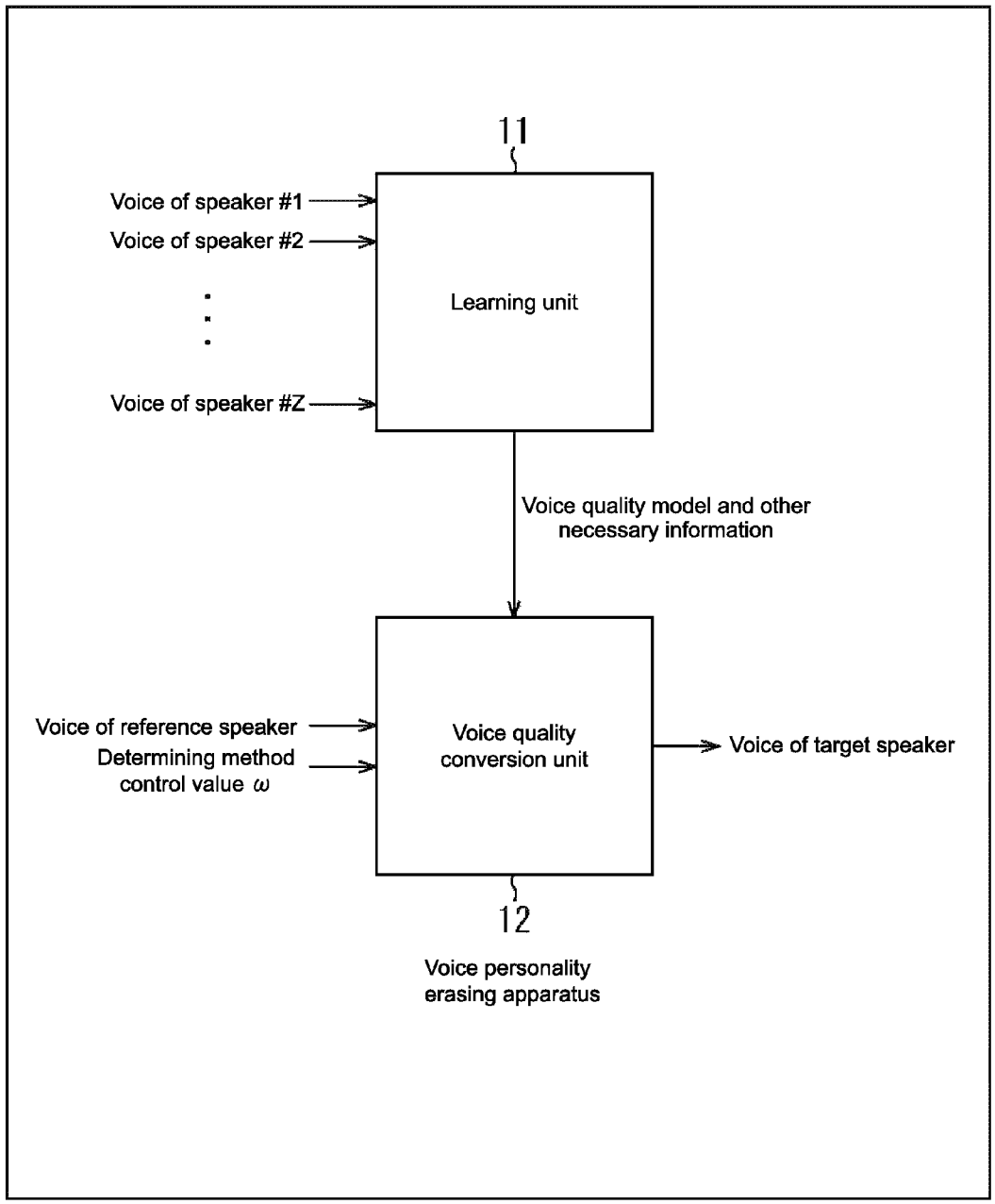
FIG. 1 is a block diagram showing a configuration example according to an embodiment of a voice personality erasing apparatus to which the present technology is applied.

FIG. 1 is a block diagram showing a configuration example according to an embodiment of a voice personality erasing apparatus to which the present technology is applied.

In FIG. 1, the voice personality erasing apparatus includes a learning unit 11 and a voice quality conversion unit 12 and erases a voice personality by performing a voice quality conversion.

The learning unit 11 receives the same utterance voices of a plurality of Z speakers #1, #2, ..., #Z used for learning for a voice quality model and the like used for the voice quality conversion (hereinafter also referred to as a voice quality model learning).

The learning unit 11 uses the voices of the Z speakers #1 to #Z supplied herein to perform the voice quality model learning, thereby generating information needed for a voice quality model and other voice quality conversion and supplying it to the voice quality conversion unit 12.

The voice quality conversion unit 12 receives the voice quality model and the like from the learning unit 11, a voice of a reference speaker whose voice quality is to be converted, and a determining method control value w for instructing a target speaker determining method of determining a target speaker whose voice quality is targeted to a voice quality conversion.

Herein, for example, the determining method control value w may be inputted by the user operating a control unit (not shown) and may be supplied from higher-level applications (not shown).

The voice quality conversion unit 12 determines the target speaker determining method used for the voice quality conversion in accordance with the determining method control value w and determines the target speaker in accordance with the target speaker determining method.

Further, the voice quality conversion unit 12 uses the voice quality model and the like from the learning unit 11 to generate the voice of the voice quality of the target speaker determined in accordance with the target speaker determining method from the voice of the reference speaker, thereby converting the voice of the reference speaker into the voice of the target speaker and outputting it.

It should be noted that the Z speakers #1 to #Z supplying the voices to the learning unit 11 may or may not include the reference speaker.

Herein, an example of a method of erasing a voice personality includes a method of raising a fundamental frequency of the voice of the reference speaker, and the voice personality can be erased by raising the fundamental frequency of the voice to a certain frequency.

However, in the method of raising the fundamental frequency of the voice, a shape of a frequency envelope of the voice which is a voice tone determinant varies as the fundamental frequency rises. The shape of frequency envelope for determining the tone is not proportional to the rise in the fundamental frequency, so that naturalness of the voice obtained by the method of raising the fundamental frequency of the voice is lost, and the voice is far different from the voice that exists in a real world.

Moreover, the erase of the voice personality can be performed not by the fundamental frequency of the voice but by the voice quality conversion for converting the tone. For example, in the voice quality conversion for converting the tone, conversion coefficients for converting the frequency envelope of the voice are learned by using the pair of the reference speaker's voice and the target speaker's voice among the voices recorded in advance. Then, the conversion coefficients obtained by the leaning are used to convert the reference speaker's voice into the target speaker's voice.

In the voice quality conversion, the learning is performed by using the target speaker's voice the user desires, so that the voice quality conversion into the target speaker's voice the user desires can be performed.

However, in this case, it is necessary to instruct, in some way, the target speaker (who speaks the voice of the voice quality) the user desires.

Moreover, although the target speaker is uniquely identified when the target speaker the user desires is instructed, the target speaker the user desires sometimes does not particularly exist in the erase of the voice personality. In this case, it is necessary to determine the target speaker of the voice quality conversion appropriately.

That is, for example, when the voice quality conversion of the voices of other persons B and C is performed to a conversation among a user A and other persons B and C in order to protect privacy of the other persons B and C, the target speaker the user A desires does not particularly exist.

However, in this case, it is troublesome that the use A needs to instruct the target speaker of the other persons B and C (the target speaker for performing the voice quality conversion of the voices of the other persons B and C).

Moreover, when the voice quality conversion of the voices of the other persons B and C is performed, it is not suitable that the same speaker D is instructed as the target speakers for the other persons B and C, for example. This is because it is difficult to distinguish the conversation between the user A and the other person B from the conversation between the user A and the other person C, and the conversation between the other persons B and C may not be established.

When the voice quality conversion of the voices of the other persons B and C is performed to the conversation among the user A and the other persons B and C, it is necessary to make the target speaker for the other person B and the target speaker for the other person C to be a different speaker so that the conversation among the user A and the other persons B and C is established. That is, it is necessary to instruct a speaker D as the target speaker for the other person B and a speaker E different from the speaker D as the target speaker for the other person C.

Moreover, it may be desirable that a speaker having a different voice from the other person B be instructed as the speaker D and that a speaker having a different voice from the other person C be instructed as the speaker E from a viewpoint of privacy protection of the other persons B and C.

Meanwhile, in some cases, the user A does not desire that a speaker having a significantly different voice quality from the other person B be instructed as the target speaker for the other person B. This applies to the other person C.

Further, the user A may desire that the voice quality of the voices of the other persons B and C be converted into the voices different from the other persons B and C, respectively without impairing an atmosphere of the conversation situations among the user A and the other persons B and C (while retaining it as much as possible).

As described above, there are various voice quality conversions as the voice quality conversion the user desires. However, it is troublesome that the user needs to instruct a specific speaker to perform the voice quality conversion the user desires.

Moreover, whether or not the voice quality conversion the user desires is performed by the target speaker the user instructs cannot be known before the voice quality conversion is actually performed.

That is, for example, when the user A desires that the voice quality of the voices of the other persons B and C be converted into the voices different from the other persons B and C, respectively, without impairing an atmosphere of the conversation situations among the user A and the other persons B and C, there are cases where the voice quality conversion into the voice quality different from the voice quality the user expects is performed even when the user A instructs the speakers D and E as the target speakers for the other persons B and C, and the atmosphere for conversations after the voice quality conversion is totally different from the atmosphere of the original conversation situations, for example.

Accordingly, in the voice personality erasing apparatus in FIG. 1, the voice quality conversion unit 12 determines the target speaker determining method used for the voice quality conversion in accordance with the determining method control value w and determines the target speaker in accordance with the target speaker determining method, so that it is possible to easily perform the voice quality conversion the user desires only by providing the determining method control value w.

<Configuration Example of Learning Unit 11>

Figure 2:
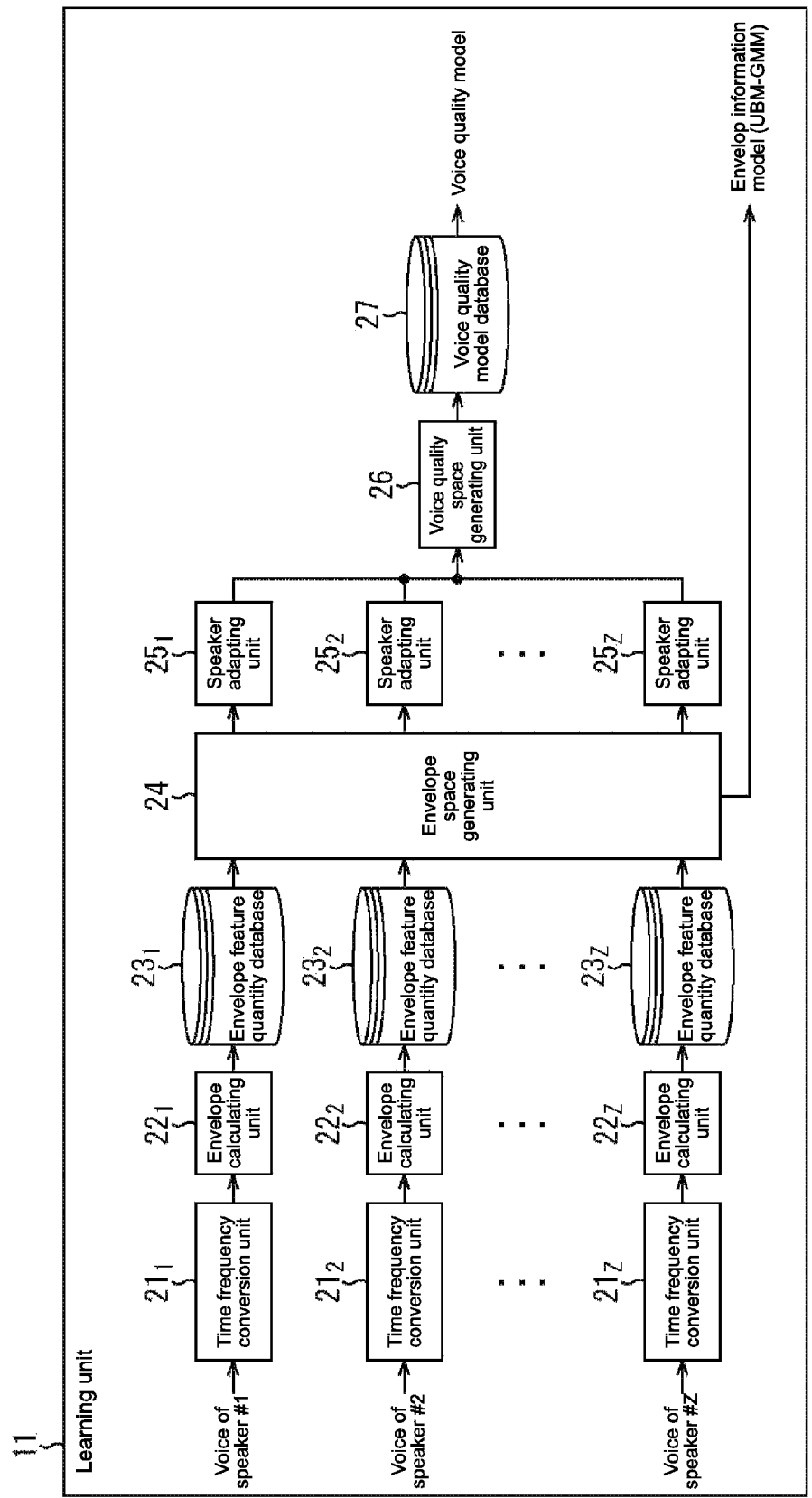
FIG. 2 is a block diagram showing a configuration example of a learning unit.

FIG. 2 is a block diagram showing a configuration example of the learning unit 11 in FIG. 1.

In FIG. 2, the learning unit 11 includes Z time frequency conversion units $21_1$, $21_2$, ... $21_Z$, Z envelope calculating units $22_1$, $22_2$, ... $22_Z$, Z envelope feature quantity databases $23_1$, $23_2$, ... $23_Z$, (one) envelope space generating unit 24, Z speaker adapting units $25_1$, $25_2$, ... $25_Z$, (one) voice quality space generating unit 26, and (one) voice quality model database 27.

<Time Frequency Conversion Unit $21_z$>

The time frequency conversion unit $21_z$ receives a voice of the speaker #z used for the voice quality model learning.

The time frequency conversion units $21_z$ uses the voice (signal) of the speaker #z supplied herein as an input signal x(t) to analyze time frequency information of the input signal x(t).

That is, for example, the time frequency conversion units $21_Z$ divides the input signal x(t) by a fixed sized (time) frame, thereby obtaining an input frame signal x(n,l).

Further, for example, the time frequency conversion units $21_z$ multiplies the input frame signal x(n,l) by a window function $w_{ana}(n)$ in Equation (1), thereby obtaining a window function adapting signal $x_w(n,l)$ in Equation (2).

$$w_{ana}(n) = \left(0.5 - 0.5\cos\left(2\pi\frac{n}{N}\right)\right)^{0.5} \quad (1)$$

$$x_w(n, l) = w_{ana}(n)x^\sim(n, l) \begin{pmatrix} x^\sim: & \text{Input signal} \\ n: & \text{Time index} \\ l: & \text{Time frame index} \\ w_{ana}: & \text{Window function} \\ x_w: & \text{Window function adapting signal} \end{pmatrix} \quad (2)$$

Herein, n is a time index of the input frame signal x(n,l) and represents a sample value of the number of the sample from the beginning of a frame l that a sample value as the input frame signal x(n,l) belongs to. Moreover, n takes values of n=0, 1, ..., N−1, and N represents a frame size of a frame, that is, a sample number of the input frame signal x(n,l) of one frame.

l is an index of a (time) frame and represents a signal of the number of the frame from the beginning of the input signal x(t) that the input frame signal x(n,l) belongs to. Moreover, l takes values of l=0, 1, ..., L−1, and L represents the number of the input frame signal x(n,l) obtained from the input signal x(t), that is, the total number of frames (a total frame number).

Further, π represents a circular constant.

It should be noted that the window function $w_{ana}(n)$ of Equation (1) is a square root of a Hanning window, but as the window function $w_{ana}(n)$, other than a Hanning window, for example, a Hamming window, a Blackman-Harris window, and other windows can be adopted.

Moreover, a frame size N is a sample number corresponding to a time fsec of one frame at a time of sampling by a sampling frequency fs of the input signal x(t), and is represented by Equation N=R(fs×fsec) when R(x) is set as a predetermined rounding function.

As the time fsec of one frame, for example, fsec=0.02 [seconds] can be adopted. Moreover, as the rounding function R(x), for example, a function for rounding off an argument x can be adopted. However, the time fsec of one frame and the rounding function R(x) are not limited to this.

Moreover, the time frequency conversion units $21_z$ divides the input signal x(t) into the input frame signal x(n,l) of a frame of the frame size N while shifting the frame on the input signal x(t), but as a frame shift amount at that time, for example, 50% of the frame size N can be adopted.

In this case, the first half of the input frame signal x(n,l) of a frame l corresponds to the rear half of the immediately preceding frame l−1.

It should be noted that the frame shift amount is not limited to 50% of the frame size N.

After the window function adapting signal $x_w(n,l)$ in Equation (2) is calculated, the time frequency conversion units $21_z$ performs the time frequency conversion of the window function adapting signal $x_w(n,l)$ and calculates an input complex spectrum $X(k,l)$.

That is, for example, the time frequency conversion units $21_z$ converts the window function adapting signal $x_w(n,l)$ of a time domain into the input complex spectrum $X(k,l)$ of a frequency domain in accordance with Equations (3) and (4).

$$\tilde{x_w}(m,l) = \begin{cases} x_w(m,l) & m = 0, \ldots, N-1 \\ 0 & m = N, \ldots, M-1 \end{cases} \quad (3)$$

$$X(k,l) = \sum_{m=0}^{M-1} \tilde{x_w}(m,l)\exp\left(-i2\pi\frac{km}{M}\right) \begin{pmatrix} \tilde{x_w}: & \text{Zero padding signal} \\ i: & \text{Pure imaginary number} \\ M: & \text{Point number of DFT} \\ k: & \text{Frequency index} \\ X: & \text{Input complex spectrum} \end{pmatrix} \quad (4)$$

Herein, $x_w(m,l)$ represents a zero padding signal obtained by performing a zero padding to the window function adapting signal $x_w(n,l)$.

m is a time index of a zero padding signal (m,l) for a time frequency conversion and represents a sample value of the number of the sample from the beginning of the frame l that a sample value as the zero padding signal $x_w(m,l)$ belongs to. Moreover, m takes values of m=0, 1, . . . , N−1, N, . . . , M−1, and M represents the number of sample of the sample value used for the time frequency conversion, that is, the number of a sample targeted for the frequency conversion.

k is a frequency index of the input complex spectrum $X(k,l)$ and represents a sample value of the number of the sample from the beginning of the frame l that a sample value as the input complex spectrum $X(k,l)$ belongs to. Moreover, k takes values of k=0, 1, . . . , K−1, and K is represented by Equation K=M/2+1.

Further, i represents an imaginary unit ($\sqrt{(-1)}$).

It should be noted that in Equation (4), a discrete Fourier transform (DFT) is adopted as the time frequency conversion. Alternatively, as the time frequency conversion, for example, a discrete cosine transform (DCT), a modified discrete cosine transform (MDCT), and other transforms from a time domain to a frequency domain can be adopted.

Moreover, in Equation (3), a signal obtained by performing a zero padding to the window function adapting signal $x_w(n,l)$ is adopted as the zero padding signal (m,l). However, when the frame size N is equal to a sample number M targeted for DFT, the window function adapting signal $x_w(n,l)$ is used as the zero padding signal $x_w(m,l)$ as it is and is targeted for DFT of Equation (4).

Further, as the sample number M targeted for DFT, for example, a value which is closest to the frame size N among values corresponding to a power of two which is equal to or greater than a free size N can be adopted. However, the sample number M targeted for DFT is not limited to the value which is closest to the frame size N among the values corresponding to the power of two which is equal to or greater than the free size N.

Thus, the time frequency conversion units $21_z$ supplies the input complex spectrum $X(k,l)$ calculated for the speaker #z to the envelope calculating unit $22_z$.

<Envelope Calculating Unit $22_z$>

The envelope calculating unit $22_z$ removes fine structures from the input complex spectrum (hereinafter simply referred to as a spectrum) $X(k,l)$ of the speaker #z supplied from the time frequency conversion units $21_z$ and calculates envelop information on envelops of the spectrum $X(k,l)$.

That is, for example, the envelope calculating unit $22_z$ calculates a linear frequency cepstrum coefficient (LFCC) in accordance with Equations (5) and (6) and extracts lower-order terms (coefficients) of the LFCC as envelop information of the spectrum $X(k,l)$ from the time frequency conversion units $21_z$.

$$V(j,l) = |X(k,l)| \quad (5)$$

$$C(j,l) = \frac{1}{M}\sum_{k=0}^{M-1}\log(V(j,l))\exp\left(-i2\pi\frac{jk}{M}\right)\begin{pmatrix} j: \text{Cepstrum index} \\ C: \text{Cepstrum} \end{pmatrix} \quad (6)$$

Herein, $C(j,l)$ represents the LFCC as envelop information on the spectrum $X(k,l)$ and is hereinafter simply referred to as a cepstrum.

j is a time index of a cepstrum $C(j,l)$ and represents a sample value of the number of the sample from the beginning of the frame l that a sample value as the cepstrum $C(j,l)$ belongs to. Moreover, j takes values of j=0, 1, . . . , J, and J represents maximum orders of the cepstrum $C(j,l)$ as envelop information on the spectrum $X(k,l)$.

It should be noted that for example, 12 can be adopted as a maximum order J of the cepstrum $C(j,l)$ as envelop information on the spectrum $X(k,l)$. However, the maximum order J of the cepstrum $C(j,l)$ as envelop information on the spectrum $X(k,l)$ is not limited to 12.

Moreover, as envelop information on the spectrum $X(k,l)$, for example, it is possible to adopt information indicating envelops of not only the spectrum $X(k,l)$ of a linear predictive cepstrum coefficient (LPCC), a mel generalized cepstrum, and other cepstrums, in addition to the LFCC, but also the spectrum $X(k,l)$ other than cepstrums.

Thus, the envelope calculating unit $22_z$ supplies the cepstrum $C(j,l)$ as envelop information on the spectrum $X(k,l)$ calculated for the speaker #z to the envelope feature quantity database $23_z$.

The envelope feature quantity database $23_z$ stores the cepstrum $C(j,l)$ as envelop information on the speaker #z supplied from the envelope calculating unit $22_z$.

Hereinafter, the cepstrum $C(j,l)$ as envelop information on the speaker #z is also referred to as $C_z(j,l)$.

Moreover, a frame number of the cepstrum $C_z(j,l)$ of the speaker #z is represented by $L_z$.

<Envelope Space Generating Unit 24>

The envelope space generating unit 24 uses the cepstrums $C_1(j,l)$ to $C_z(j,l)$ as envelop information stored in the envelope feature quantity databases $23_1$ to $23_z$ to learn (generate) a Universal Background Model—Gaussian Mixture Model (UBM-GMM) as an envelop information model obtained by modeling the envelop information, for example.

That is, with respect to the envelope feature quantity databases $23_1$ to $23_z$, the envelope space generating unit 24 randomly samples the cepstrum $C_z(j,l)$ of an L/Z($<L_z$) frame from the cepstrum $C_z(j,l)$ of an $L_z$ frame (number) stored in the envelope feature quantity database $23_z$.

With respect to the Z envelope feature quantity databases $23_1$ to $23_z$, the cepstrum $C_z(j,l)$ of the L/Z frame is randomly sampled, thereby obtaining the cepstrum $C_z(j,l)$ of an L frame in total.

Herein, the cepstrum $C_z(j,l)$ of the L/Z frame of the speaker #z sampled from the cepstrum $C_z(j,l)$ of the $L_z$ frame stored in the envelope feature quantity databases $23_z$ is also referred to as a speaker cepstrum $C_z(j,l)$.

Moreover, hereinafter, the cepstrum $C_z(j,l)$ of the L frame, which is a set of the cepstrum $C_z(j,l)$ of the L/Z frame of the speakers #1 to #Z, is also referred to as an overall speaker cepstrum $C(j,l)$.

A speaker cepstrum $C_z(j,l)$ of each speaker #Z exists as many as the number of the L/Z frame, so that the index l of the speaker cepstrum $C_z(j,l)$ takes values of l=0, 1, ..., L/Z−1.

The overall speaker cepstrum $C(j,l)$ exists as many as the number of the L frame, so that the index l of the overall speaker cepstrum $C(j,l)$ takes values of l=0, 1, ..., L−1.

In the envelope space generating unit 24, the overall speaker cepstrum $C(j,l)$ is used to learn UBM-GMM in accordance with Expectation Maximum (EM) algorithm, for example. Therefore, a model parameter $\theta'_p = \{\mu'_p, \Sigma'_p, \pi'_p\}$ of the UBM-GMM is calculated in accordance with Equations (7), (8), (9), (10), and (11).

$$\gamma_p(l) = \frac{\pi'_p N\left(C^\sim(j,l) | \mu'_p, \sum'_p\right)}{\sum_{q=0}^{P-1} \pi'_p N(C^\sim(j,l) | \mu'_p, \Sigma'_p)} \quad \begin{pmatrix} \gamma_p\text{:} & \text{Coverage rate of} \\ & \text{Gaussian distribution} \\ P\text{:} & \text{Number of mixtures of } GMM \end{pmatrix} \quad (7)$$

$$L_p = \sum_{l=0}^{L^\sim-1} \gamma_p(l) \quad (8)$$

$$\mu'_p = \frac{1}{L_p} \sum_{l=0}^{L^\sim-1} \gamma_p(l) C^\sim(j,l) \quad (9)$$

$$\sum'_p = \frac{1}{L_p} \sum_{l=0}^{L^\sim-1} \gamma_p(l)(C^\sim(j,l) - \mu'_p)(C^\sim(j,l) - \mu'_p)^T \quad (10)$$

$$\pi'_p = \frac{L_p}{L^\sim} \quad (11)$$

Herein, p is an index of a Gaussian distribution constituting GMM (UBM-GMM) and takes values of p=0, 1, 2, ..., P−1. P represents a total number of the Gaussian distribution (the number of mixtures of GMM) constituting the GMM.

$\theta'_p = \{\mu'_p, \Sigma'_p, \pi'_p\}$ represents a parameter of a p-th (with a first one being zero) Gaussian distribution of the GMM. $\mu'_p$ and $\Sigma'_p$ represent a mean vector and a covariance matrix of the p-th Gaussian distribution of the GMM. $\pi'_p$ represents weights of the p-th Gaussian distribution of the GMM (herein, a contribution rate of the p-th Gaussian distribution when the overall speaker cepstrum $C(j,l)$ is observed).

$N(C(j,l)|\mu'_p, \Sigma'_p)$ represents a probability that the overall speaker cepstrum $C(j,l)$ is observed in a p-th Gaussian distribution $N(\mu'_p, \Sigma'_p)$ (Gaussian distribution having a mean vector of $\mu'_p$ and a covariance matrix of $\Sigma'_p$).

A superscript "T" represents transpose. The envelope space generating unit 24 sets, for example, a random value as an initial value of the model parameter $\theta'_p = \{\mu'_p, \Sigma'_p, \pi'_p\}$, uses the overall speaker cepstrum $C(j,l)$ as a learning data for UBM-GMM, and repeats calculations in Equations (7) to (11), for example, only for the predetermined number of times of learning U, thereby performing learning for generating the UBM-GMM as the envelop information model obtained by modeling the cepstrums $C_1(j,l)$ to $C_z(j,l)$ as envelop information.

Thus obtained UBM-GMM represents distribution of the envelope information on various speakers in an envelope space of the cepstrum $C_z(j,l)$ as envelop information.

The envelope space generating unit 24 supplies the thus generated UBM-GMM as the envelop information model, that is, the model parameter $\theta'_p = \{\mu'_p, \Sigma'_p, \pi'_p\}$ of the UBM-GMM, to the speaker adapting units $25_1$ to $25_z$ and the voice quality conversion unit 12.

Further, the envelope space generating unit 24 supplies the speaker cepstrum $C_z(j,l)$ of the L/Z frame of the speaker #z to the speaker adapting unit $25_z$.

It should be noted that as the number of times of learning U, the number of times, for example, 200 times and other times, enough for convergence of the model parameter $\theta'_p = \{\mu'_p, \Sigma'_p, \pi'_p\}$ can be adopted.

Moreover, learning of the GMM, that is, calculations in Equations (7) to (11) can be performed until the model parameter $\theta'_p = \{\mu'_p, \Sigma'_p, \pi'_p\}$ is converged.

Further, a random value can be set as the initial value of the model parameter $\theta'_p = \{\mu'_p, \Sigma'_p, \pi'_p\}$. Alternatively, a hard clustering technique such as a k-means method can be used to set the initial value.

<Speaker Adapting Unit $25_z$>

The speaker adapting unit $25_z$ uses the speaker cepstrum $C_z(j,l)$ of the L/Z frame of the speaker #z from the envelope space generating unit 24 to perform a speaker adaption of the UBM-GMM as the envelop information model from the envelope space generating unit 24, for example, by a MAP adaptation, thereby generating the MAP-GMM which is the GMM adapted to the speaker #z.

That is, the speaker adapting unit $25_z$ calculates Equations (12), (13), (14), (15), (16), (17), and (18) and perform the speaker adaption of the UBM-GMM, thereby generating the MAP-GMM adapted to each speaker #z.

$$\gamma'_p(l) = \frac{\pi'_p N\left(C^\sim_z(j,l) | \mu'_p, \sum'_p\right)}{\sum_{q=0}^{P-1} \pi'_p N(C^\sim_z(j,l) | \mu'_p, \Sigma'_q)} \quad (12)$$

$$L'_p = \sum_{l=0}^{L^\sim/Z-1} \gamma'_p(l) \quad (13)$$

$$\rho_p = \frac{1}{L'_p} \sum_{l=0}^{L^\sim/Z-1} \gamma'_p(l) C^\sim_z(j,l) \quad (14)$$

$$\sigma_p = \frac{1}{L'_p} \sum_{l=0}^{L^\sim/Z-1} \gamma'_p(l)(C^\sim_z(j,l) - \rho_p)(C^\sim_z(j,l) - \rho_p)^T \quad (15)$$

$$\alpha_p = L'_p / (L'_p + \varepsilon) \quad (\varepsilon: \text{Adaptive coefficient}) \quad (16)$$

$$\mu_{z,p} = \alpha_p \rho_p + (1 - \alpha_p) \mu'_p \quad (17)$$

$$\sum_{z,p} = \alpha_p \sigma_p + (1 - \alpha_p)(\mu'_p \mu'^T_p + \sigma_p) - \mu_{z,p} \mu^T_{z,p} \quad (18)$$

Herein, an appropriate value is set to an adaptive coefficient in advance.

$\mu_{z,p}$ and $\Sigma_{z,p}$ represent a mean vector and a covariance matrix of the p-th Gaussian distribution of the MAP-GMM adapted to the speaker #z.

Thus, when the speaker adapting unit $25_Z$ generates the MAP-GMM adapted to the speaker #z, the speaker adapting unit $25_Z$ usesa mean vector $\mu_{z,p}$ which is a model parameter of the MAP-GMM to generate, as a voice quality parameter for representing a voice quality of the speaker #z, a speaker super-vector $S_z$ for setting, as a component, mean vectors $\mu_{z,0}, \mu_{z,1}, \ldots, \mu_{z,P-1}$ of P Gaussian distribution constituting the MAP-GMM, in accordance with Equation (19) and provides it to the voice quality space generating unit 26.

$$S_z = [\mu_{z,0}^T, \mu_{z,1}^T, \ldots, \mu_{z,P-1}^T]^T \quad (19)$$

<Voice Quality Space Generating Unit 26>

The voice quality space generating unit 26 generates, as the voice quality model used for a voice conversion, distribution of the speaker super-vector $S_z$ as a voice quality parameter supplied from the speaker adapting unit $25_Z$ in a voice quality space which is a space of the voice quality parameter.

That is, the voice quality space generating unit 26 classifies the speaker super-vectors $S_1$ to $S_Z$ as the voice quality parameter supplied from the speaker adapting units $25_1$ to $25_Z$ in accordance with predetermined criteria for classification and generates distribution of the speaker super-vector $S_z$ in each class as the voice quality model.

Specifically, for example, the voice quality space generating unit 26 calculates a mean value (a mean vector) $\psi_r$ and a covariance (a covariance matrix) $\phi_r$ of the Gaussian distribution which represent the distribution of the speaker super-vector $S_z$ in each class #r as the voice quality model in accordance with Equations (20) and (21).

$$\psi_r = \frac{1}{Z_r} \sum_{Z \in A_i} S_z \quad (20)$$

$$\phi_r = \frac{1}{Z_r} \sum_{Z \in A_i} (S_z - \psi_r)(S_z - \psi_r)^T \quad (21)$$

Herein, the class #r takes values of r=0, 1, ..., R−1, and R represents a total number of class.

$A_r$ represents a set of the speaker super-vector $S_z$ belonging to the class #r.

$Z_r$ represents the number of the speaker super-vector $S_z$ belonging to the class #r, and a sum total $(Z_0+Z_1+ \ldots +Z_{R-1})$ of $Z_r$ is equal to a total number Z of the speakers #1 to #Z.

The voice quality space generating unit 26 supplies the thus calculated mean value $\psi_r$ and the covariance $\phi_r$ of the Gaussian distribution (voice quality parameter distribution) of the speaker super-vector $S_z$ as the voice quality model in each class to the voice quality model database 27.

The voice quality model database 27 stores the mean value $\psi_r$ and the covariance $\phi_r$ of the Gaussian distribution of the speaker super-vector $S_z$ as the voice quality model in each class from the voice quality space generating unit 26.

It should be noted that as a class for classifying the speaker super-vector $S_z$, for example, R=4(=2×2) class can be adopted as criteria for classification to set a combination in case that the speaker #z is a man or a woman and the speaker #z is an oriental or a westerner.

It should be noted that the criteria for classification and a sum total R of class for classifying the speaker super-vector $S_z$ are not limited to this.

<Process of Learning Unit 11>

Figure 3:
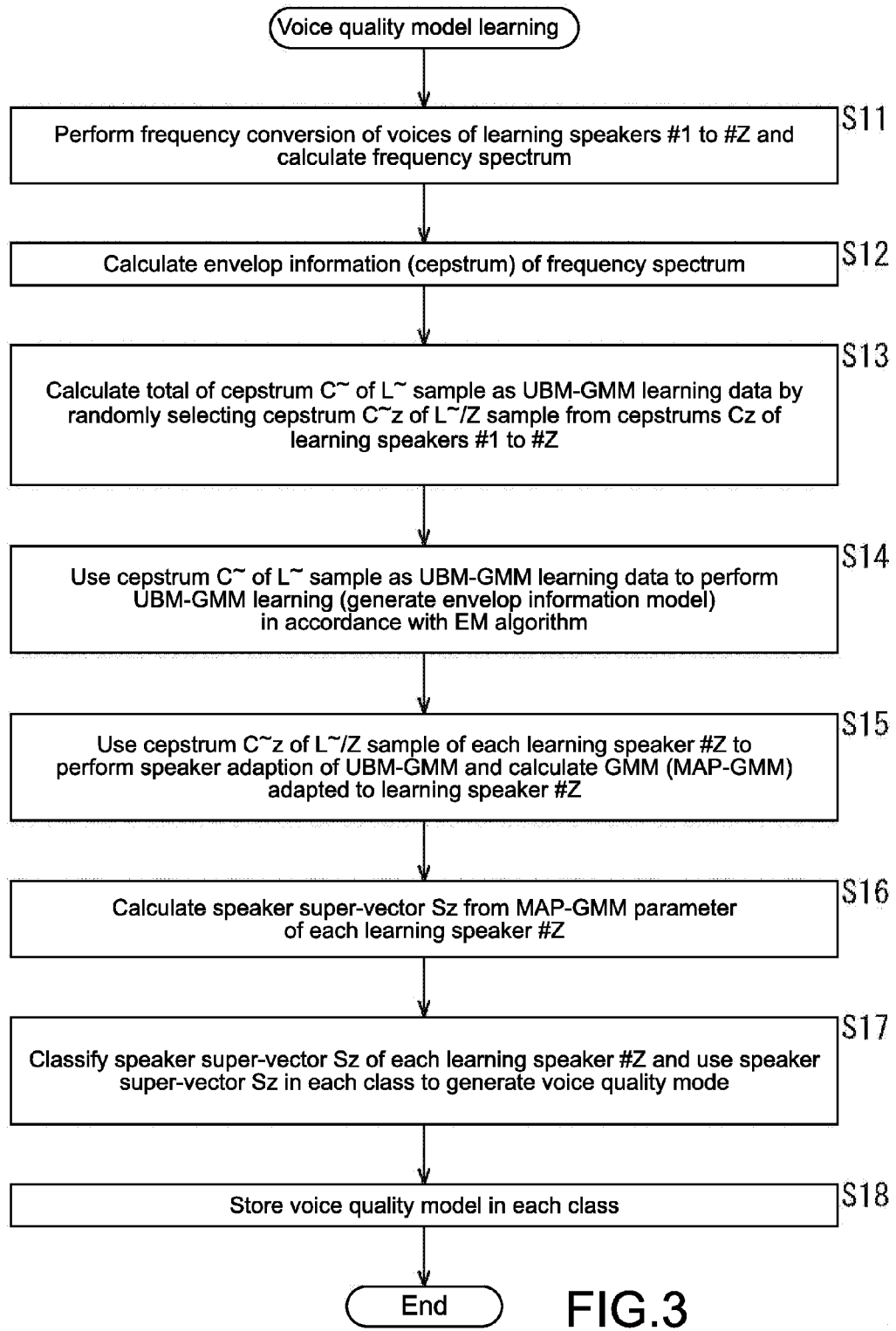
FIG. 3 is a flowchart describing a process of a voice quality model learning carried out by the learning unit.

FIG. 3 is a flowchart describing a process of a voice quality model learning carried out by the learning unit 11 in FIG. 2.

In step S11, the time frequency conversion units $21_z$ obtains a voice of the speaker #z used for the voice quality model learning and frequency-converts the input signal x(t) in accordance with Equations (1) to (4) by setting the voice (signal) of the speaker #z as the input signal x(t), thereby calculating the spectrum X(k,l).

Then, the time frequency conversion units $21_z$ supplies the spectrum X(k,l) to the envelope calculating unit $22_Z$, and the process proceeds to from step S11 to step S12.

In step S12, the envelope calculating unit $22_Z$ calculates the cepstrum C(j,l) as the envelop information of the spectrum X(k,l) from the time frequency conversion unit $21_z$ in accordance with Equations (5) and (6) and supplies it to the envelope feature quantity databases $23_z$ for storage, and the process proceeds to step S13.

In step S13, with respect to the envelope feature quantity databases $23_1$ to $23_z$, the envelope space generating unit 24 randomly samples the cepstrum $C_z(j,l)$ of the L/Z frame (sample), as the speaker cepstrum $C_z(j,l)$, from the cepstrum $C_z(j,l)$ stored in the envelope feature quantity database $23_z$, thereby calculating a total of the speaker cepstrum $C_z(j,l)$ of the L frame as the overall speaker cepstrum C(j,l) which is a learning data used for the UBM-GMM learning.

Subsequently, the process proceeds to from step S13 to step S14. The envelope space generating unit 24 uses the overall speaker cepstrum C(j,l) to perform the UBM-GMM learning in accordance with Equations (7) to (11), thereby generating the UBM-GMM as the envelop information model.

Then, the envelope space generating unit 24 supplies the UBM-GMM as the envelop information model to the speaker adapting units $25_1$ to $25_Z$ and the voice quality conversion unit 12 and supplies the speaker cepstrum $C_z(j,l)$ of the L/Z frame of the speaker #z to the speaker adapting unit $25_Z$, and process proceeds to from step S14 to step S15.

In step S15, the speaker adapting unit $25_Z$ uses the speaker cepstrum $C_z(j,l)$ of the L/Z frame of the speaker #z from the envelope space generating unit 24 to perform a speaker adaption of the UBM-GMM as the envelop information model from the envelope space generating unit 24 in accordance with Equations (12) to (18), thereby generating the MAP-GMM adapted to the speaker #z. Then, the process proceeds to step S16.

In step S16, the speaker adapting unit $25_z$ use the mean vector $\mu_{z,p}$ which is the model parameter of the MAP-GMM adapted to the speaker #z to generate the speaker super-vector $S_z$ as a voice quality parameter of the speaker #z in accordance with Equation (19) and supplies it to the voice quality space generating unit 26, and the process proceeds to step S17.

In step S17, the voice quality space generating unit 26 classifies the speaker super-vectors $S_1$ to $S_z$ as the voice quality parameter supplied from the speaker adapting units $25_1$ to $25_z$ and uses the speaker super-vector $S_z$ in each class to calculate the mean value $\psi_r$ and the covariance $\phi_r$ of the speaker super-vector $S_z$ in each class #r as the voice quality model in accordance with Equations (20) and (21).

Then, the voice quality space generating unit 26 supplies the mean value $\psi_r$ and the covariance $\phi_r$ of the Gaussian distribution of the speaker super-vector $S_z$ in each class #r as the voice quality model to the voice quality model database 27, and the process proceeds to from step S17 to step S18.

In step S18, the voice quality model database 27 stores the mean value $\psi_r$ and the covariance $\phi_r$ of the Gaussian distribution of the speaker super-vector $S_z$ in each class #r as the voice quality model from the voice quality space generating unit 26, and the process for the voice quality mode learning is completed.

It should be noted that in the learning unit 11, the voice quality model learning can be performed in real time when the voice quality conversion is performed in the voice quality conversion unit 12, for example.

Moreover, in the learning unit 11, the voice quality model learning can be performed in advance, for example.

When the voice quality model learning is performed in the learning unit 11 in advance, a voice quality model obtained by the voice quality model learning and the UBM-GMM as the envelop information model are supplied to the voice quality conversion unit 12 in advance, so that the voice personality erasing apparatus in FIG. 1 can be constituted by only the voice quality conversion unit 12 without providing the learning unit 11.

<Configuration Example of Voice Quality Conversion Unit 12>

Figure 4:
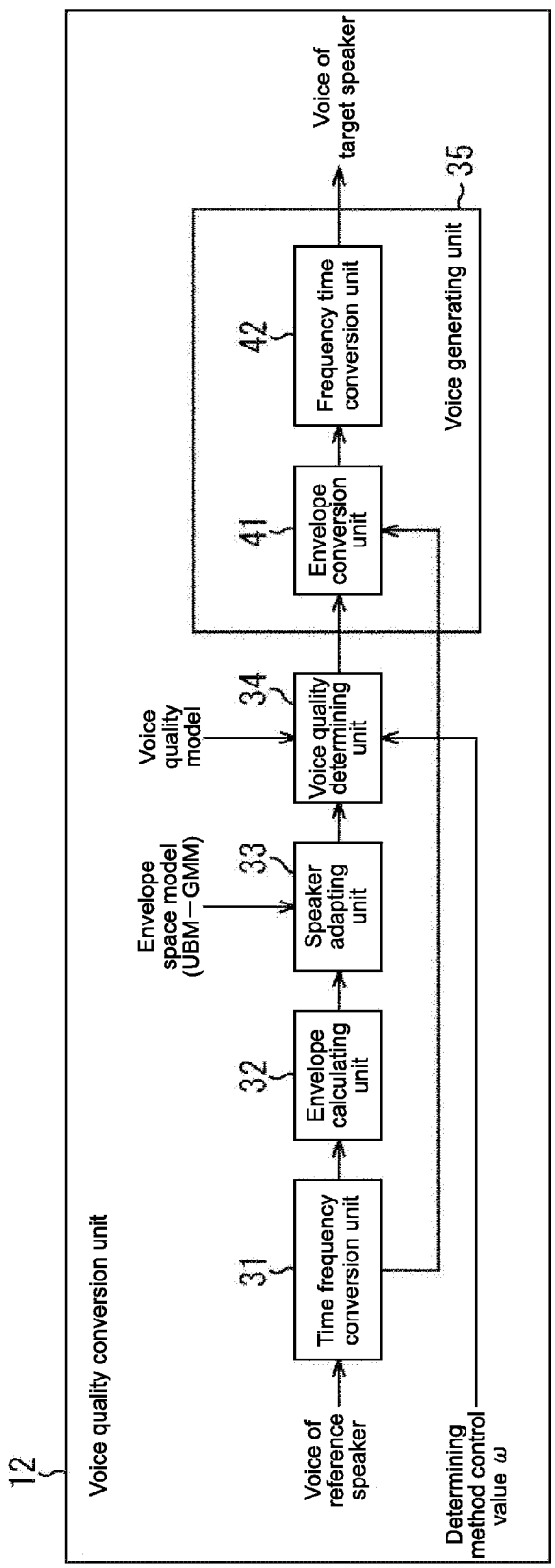
FIG. 4 is a block diagram showing a configuration example of a voice quality conversion unit.

FIG. 4 is a block diagram showing a configuration example of the voice quality conversion unit 12 in FIG. 1.

In FIG. 4, the voice quality conversion unit 12 includes a time frequency conversion unit 31, an envelope calculating unit 32, a speaker adapting unit 33, a voice quality determining unit 34, and a voice generating unit 35 and uses the voice quality model and the like from the learning unit 11 to convert the frequency envelope of the voice of the reference speaker, thereby converting the voice quality of the voice of the reference speaker.

<Time Frequency Conversion Unit 31>

The time frequency conversion unit 31 receives the voice of the reference speaker.

The time frequency conversion unit 31 converts the frequency of the voice of the reference speaker as with the time frequency conversion unit $21_z$ in FIG. 2, thereby calculating the spectrum $X(k,l)$ and supplying it to the envelope calculating unit 32 and the voice generating unit 35.

<Envelope Calculating Unit 32>

The envelope calculating unit 32 calculates the cepstrum $C(j,l)$ as envelope information of the reference speaker from the spectrum $X(k,l)$ out of the time frequency conversion unit 31 as with the envelope calculating unit $22_z$ in FIG. 2 and supplies it to the speaker adapting unit 33.

Hereinafter, the cepstrum $C(j,l)$ as the envelope information of the reference speaker is also referred to as a reference speaker cepstrum $C_{org}(j,l)$.

Moreover, the frame number of the reference speaker cepstrum $C_{org}(j,l)$ is represented by $L_{org}$. An index l of the frame of the reference speaker cepstrum $C_{org}(j,l)$ takes values of $l=0, 1, L_{org}-1$.

<Speaker Adapting Unit 33>

The speaker adapting unit 33 receives the reference speaker cepstrum $C_{org}(j,l)$ as the envelope information of the reference speaker from the envelope calculating unit 32 and also receives (model parameter $\theta'_p = \{\mu'_p, \Sigma'_p, \pi'_p\}$ of) the UBM-GMM as the envelop information model from the envelope space generating unit 24 of the learning unit 11 (FIG. 2).

The speaker adapting unit 33 uses the reference speaker cepstrum $C_{org}(j,l)$ from the envelope calculating unit 32 as with the speaker adapting unit $25_z$ in FIG. 2 to perform the speaker adaption of the UBM-GMM from the learning unit 11, thereby generating the MAP-GMM adapted to the reference speaker.

Further, the speaker adapting unit 33 uses a mean vector $\mu_{org,p}$ which is the model parameter of the MAP-GMM adapted to the reference speaker as with the speaker adapting unit $25_z$ in FIG. 2 to generate, as a voice quality parameter representing the voice quality of the reference speaker, a speaker super-vector $S_{org} = [\mu_{org,0}^T, \mu_{org,1}^T, \ldots, \mu_{org,P-1}^T]^T$ for setting, as a component, mean vectors $\mu_{org,0}, \mu_{org,1}, \ldots, \mu_{org,P-1}$ of the P Gaussian distribution constituting the MAP-GMM, and supplies it to the voice quality determining unit 34 together with the reference speaker cepstrum $C_{org}(j,l)$ from the envelope calculating unit 32.

<Voice Quality Determining Unit 34>

The voice quality determining unit 34 receives a speaker super-vector $S_{org} = [\mu_{org,0}^T, \mu_{org,1}^T, \ldots \mu_{org,P-1}^T]^T$ as a voice quality parameter of the reference speaker and the reference speaker cepstrum $C_{org}(j,l)$ from the speaker adapting unit 33 and also receives the determining method control value w.

Further, the voice quality determining unit 34 receives the mean value $\psi_r$ and the covariance $\phi_r$ (the mean value $\psi_r$ and the covariance $\phi_r$ for defining distribution (voice quality parameter distribution) of the speaker super-vector $S_z$) of the speaker super-vector $S_z$ in each class #r as the voice quality model stored in the voice quality model database 27 of the learning unit 11 (FIG. 2).

The voice quality determining unit 34 determines the target speaker determining method used for the voice quality conversion as an attention determining method for attention in accordance with the determining method control value w.

Then, the voice quality determining unit 34 determines the target speaker in accordance with the attention determining method.

That is, the voice quality determining unit 34 uses the mean value $\psi_r$ and the covariance $\phi_r$ of the speaker super-vector $S_z$ in each class #r as the voice quality model as well as the speaker super-vector $S_{org}$ as a voice quality parameter of the reference speaker to determine (calculate) a speaker super-vector $S_{tar}$ as a voice quality parameter of the target speaker in accordance with the attention determining method.

Herein, in the present embodiment, three determining methods including, for example, a first determining method, a second determining method, and a third determining method are prepared as the target speaker determining method.

Then, the determining method control value w takes, for example, values of w=0, 1, 2. In the voice quality determining unit 34, the attention determining method is determined to be one of the first determining method to the third determining method in accordance with the determining method control value w.

For example, when the determining method control value w is 0, the first determining method is determined as the attention determining method. Moreover, for example, when the determining method control value w is 1, the second determining method is determined as the attention determining method, and when the determining method control value w is 2, the third determining method is determined as the attention determining method.

The first determining method is a method of randomly sampling distribution (voice quality parameter distribution) of the speaker super-vector $S_z$ in each class #r that a speaker super-vector $S_{org}$ as a voice quality parameter of the reference speaker belongs to, and determining (the voice quality spoken by) a speaker super-vector S corresponding to a sampling point obtained as a result of the sampling to be the speaker super-vector $S_{tar}$ as a voice quality parameter of the target speaker.

In the first determining method, the distribution of the speaker super-vector $S_z$ in each class #r that a speaker super-vector $S_{org}$ as a voice quality parameter of the reference speaker belongs to, is used to determine the speaker super-vector $S_{tar}$ as the voice quality parameter of the target speaker in accordance with Equations (22) and (23).

$$S_{tar} \sim N(\psi_r, \phi_r) \quad (22)$$

$$S_{tar} = [\mu_{tar,0}{}^T, \mu_{tar,1}{}^T, \ldots, \mu_{tar,P-1}{}^T]^T \quad (23)$$

Herein, Equation (22) represents that the speaker super-vector $S_{tar}$ is the mean value $\psi_r$, and the covariance $\phi_r$ is generated from the Gaussian distribution $N(\psi_r, \phi_r)$.

Moreover, $\mu_{tar,p}$ which is a component of the speaker super-vector $S_{tar}$ represents the mean value of the p-th Gaussian distribution of the GMM having the P Gaussian distribution.

The second determining method is a method of randomly sampling distribution (voice quality parameter distribution) of the speaker super-vector $S_z$ in each class #r' different from each class #r that a speaker super-vector $S_{org}$ as a voice quality parameter of the reference speaker belongs to, and determining (the voice quality spoken by) the speaker super-vector S corresponding to the sampling point obtained as a result of the sampling to be (the voice quality spoken by) the speaker super-vector $S_{tar}$ as a voice quality parameter of the target speaker.

In the second determining method, for example, distribution of the speaker super-vector $S_z$ in each class #r' different from each class #r that a speaker super-vector $S_{org}$ as a voice quality parameter of the reference speaker belongs to is used to determine the speaker super-vector $S_{tar}$ as a voice quality parameter of the target speaker in accordance with Equations (24) and (25).

$$S_{tar} \sim N(\psi_{r'}, \phi_{r'}) \quad (24)$$

$$S_{tar} = [\mu_{tar,0}{}^T, \mu_{tar,1}{}^T, \ldots, \mu_{tar,P-1}{}^T]^T \quad (25)$$

The third determining method is a method of, in the distribution (voice quality parameter distribution) of the speaker super-vector $S_z$ in each class #r that the speaker super-vector $S_{org}$ as a voice quality parameter of the reference speaker belongs to, determining (the voice quality spoken by) the speaker super-vector S corresponding to a point where a point corresponding to the speaker super-vector $S_{org}$ as a voice quality parameter of the reference speaker is shifted in a point symmetry direction with respect to a predetermined point to be the speaker super-vector $S_{tar}$ as a voice quality parameter of the target speaker.

In the third determining method, for example, the speaker super-vector S corresponding to a point which is located in a point symmetry direction with respect to the mean value $\psi_r$ of the speaker super-vector $S_z$ in each class #r that the speaker super-vector $S_{org}$ of the reference speaker belongs to viewing from the speaker super-vector $S_{org}$ of the reference speaker and which is located at a distance Dr determined from the speaker super-vector $S_{org}$ of the reference speaker by the covariance $\phi_r$ of the distribution of the speaker super-vector $S_z$ in each class #r that the speaker super-vector $S_{org}$ of the reference speaker belongs to is determined to be the speaker super-vector $S_{tar}$ as a voice quality parameter of the target speaker in accordance with Equations (26), (27) and (28).

$$D_r = \sqrt{\sum_{r=0}^{R-1} e_r} \quad (26)$$

$$S_{tar} = \psi_r + (\psi_r - S_{org}) \frac{D_r}{\|\psi_r - S_{org}\|_F} \quad (27)$$

$$S_{tar} = [\mu_{tar,0}^T, \mu_{tar,1}^T, \ldots, \mu_{tar,P-1}^T]^T \quad (28)$$

Herein, according to Equation (26), a square root of an additional value obtained by adding an eigenvalue $e_r$ of the covariance $\phi_r$ to a dimensional direction is used as the distance Dr.

Moreover, $\|x\|_F$ represents a Frobenius norm of x.

In the first and the third determining methods, the speaker super-vector S distributed in the distribution (voice quality parameter distribution) of the speaker super-vector $S_z$ in each class #r that the speaker super-vector $S_{org}$ as a voice quality parameter of the reference speaker belongs to is determined to be the speaker super-vector $S_{tar}$ as a voice quality parameter of the target speaker, so that the voice quality conversion for erasing the voice personality of the reference speaker can be performed while storing (retaining) an atmosphere of an utterance situation of a voice of the reference speaker to some extent.

Moreover, in the first determining method, the speaker super-vector S corresponding to a sampling point where the distribution (voice quality parameter distribution) of the speaker super-vector $S_z$ in each class #r that the speaker super-vector $S_{org}$ as a voice quality parameter of the reference speaker belongs to is randomly sampled is determined to be the speaker super-vector $S_{tar}$ as a voice quality parameter of the target speaker, so that the distribution of the speaker super-vector as a voice quality parameter of each speaker that exists in the utterance situation of the voice of the reference speaker is unlikely to change significantly.

In the second determining method, the speaker super-vector S distributed in the distribution (voice quality parameter distribution) of the speaker super-vector $S_z$ in each class #r' different from each class #r that a speaker super-vector $S_{org}$ as a voice quality parameter of the reference speaker belongs to is determined to be the speaker super-vector $S_{tar}$ as a voice quality parameter of the target speaker, so that it is possible to perform the voice quality conversion for strongly erasing the voice personality of the reference speaker without storing an atmosphere of the utterance situation of the voice of the reference speaker.

In the third determining method, in the distribution of the speaker super-vector $S_z$ in each class #r that the speaker super-vector $S_{org}$ as a voice quality parameter of the reference speaker belongs to, the speaker super-vector S corresponding to a point where a point corresponding to the speaker super-vector $S_{org}$ as a voice quality parameter of the reference speaker is shifted in a point symmetry direction with respect to a predetermined point is determined to be the speaker super-vector $S_{tar}$ as a voice quality parameter of the target speaker, so that it is possible to perform the voice quality conversion for strongly erasing the voice personality of the reference speaker while storing an atmosphere of the utterance situation of the voice of the reference speaker.

Further, in the third determining method, the speaker super-vector $S_{tar}$ of the target speaker is determined as the speaker super-vector S corresponding to a point where a point corresponding to the speaker super-vector $S_{org}$ of the reference speaker is shifted in a point symmetry direction with respect to a predetermined point, so that when the speaker super-vector $S_{org}$ is different, the speaker super-vector $S_{tar}$ of the target speaker is also different. Therefore, regarding the different reference speaker, a different speaker is determined as the target speaker. As a result, with respect to the different reference speaker, it is possible to prevent the same speaker from being determined as the target speaker.

It should be noted that the class #r that the speaker super-vector $S_{org}$ of the reference speaker belongs to can be inputted by the user such as the reference speaker.

Moreover, regarding the class #r that the speaker super-vector $S_{org}$ of the reference speaker belongs to, the voice quality determining unit 34 recognizes whether the reference speaker is a man or a woman based on a pitch frequency the voice of the reference speaker, builds a Global Positioning System (GPS) and the like in the voice quality conversion unit 12, and recognizes whether a region where the voice quality conversion unit 12 exists obtained by providing, to a function f(g), information g of the region where the voice quality conversion unit 12 obtained from the GPS exists is a region where an oriental or a westerner lives. Then, based on the recognition results, the voice quality determining unit 34 can determine the class #r that the speaker super-vector $S_{org}$ of the reference speaker belongs to.

Alternatively, for example, in the voice quality determining unit 34, the class #r of the distribution of the speaker super-vector $S_z$ as the voice quality model having the mean value $\psi_r$ closest to the speaker super-vector $S_{org}$ of the reference speaker can be determined as a class that the speaker super-vector $S_{org}$ of the reference speaker belongs to.

When the voice quality determining unit 34 determines the speaker super-vector $S_{tar}$ as a voice quality parameter of the target speaker, the voice quality determining unit 34 calculates, for example, a cepstrum (hereinafter also referred to as a target speaker cepstrum) $C_{tar}(j,l)$ as envelope information of the target speaker from the speaker super-vector $S_{tar}$ in accordance with Equations (29), (30), (31), (32), (33), (34), and (35) and supplies it to the voice generating unit 35 together with the reference speaker cepstrum $C_{org}(j,l)$ from the speaker adapting unit 33.

$$\mu'_{org} = \frac{1}{P}\sum_{p=0}^{P-1} \mu_{org,p} \quad (29)$$

$$\mu'_{tar} = \frac{1}{P}\sum_{p=0}^{P-1} \mu_{tar,p} \quad (30)$$

$$\hat{\mu}_{org,p} = \mu_{org,p} - \mu'_{org} \quad (31)$$

$$\hat{\mu}_{tar,p} = \mu_{tar,p} - \mu'_{tar} \quad (32)$$

$$\hat{\mu}_{org} = [\hat{\mu}_{org,0}, \hat{\mu}_{org,1}, \ldots, \hat{\mu}_{org,P-1}] \quad (33)$$

$$\hat{\mu}_{tar} = [\hat{\mu}_{tar,0}, \hat{\mu}_{tar,1}, \ldots, \hat{\mu}_{tar,P-1}] \quad (34)$$

$$C_{tar}(j,l) = \quad (35)$$
$$\hat{\mu}_{tar}\hat{\mu}_{org}^T{}^\wedge(\hat{\mu}_{tar}\hat{\mu}_{org}^{\wedge T})^{-1}C_{org}(j,l) + (\mu'_{tar} - \hat{\mu}_{tar}\hat{\mu}_{org}^{\wedge T}(\hat{\mu}_{tar}\hat{\mu}_{org}^{\wedge T})^{-1}\mu'_{org})$$

<Voice Generating Unit 35>
The voice generating unit 35 includes an envelope conversion unit 41 and a frequency time conversion unit 42 and generates and outputs the voice of the voice quality of the target speaker from (a spectrum of) the voice of the reference speaker.

<Envelope Conversion Unit 41>
The envelope conversion unit 41 receives a target speaker cepstrum $C_{tar}(j,l)$ and a reference speaker cepstrum $C_{org}(j,l)$ from the voice quality determining unit 34. Further, the envelope conversion unit 41 receives the spectrum X(k,l) of (the voice of) the reference speaker from the time frequency conversion unit 31.

The envelope conversion unit 41 uses the target speaker cepstrum $C_{tar}(j,l)$ and the reference speaker cepstrum $C_{org}(j,l)$ to convert an envelope of the spectrum X(k,l) of the reference speaker.

In order to receive the frequency envelope used for conversion of the spectrum X(k,l) of the reference speaker, the envelope conversion unit 41 performs a zero padding to high-frequency ranges of the reference speaker cepstrum $C_{org}(j,l)$ and the target speaker cepstrum $C_{tar}(j,l)$ and recoverts the reference speaker cepstrum $C_{org}(j,l)$ and the target speaker cepstrum $C_{tar}(j,l)$ after the zero padding into a signal of a frequency domain from a signal of a cepstrum domain (time domain) in accordance with Equations (36) and (37).

$$V_{org}(k,l) = \exp\left(\sum_{j=0}^{M-1} C_{org}(j,l)\exp\left(i2\pi\frac{jk}{M}\right)\right) \quad (36)$$

$$V_{tar}(k,l) = \exp\left(\sum_{j=0}^{M-1} C_{tar}(j,l)\exp\left(i2\pi\frac{jk}{M}\right)\right) \quad (37)$$

Herein, $V_{org}(k,l)$ represents envelope information on the frequency domain of the reference speaker, and $V_{tar}(k,l)$ represents envelope information on the frequency domain of the target speaker.

The envelope conversion unit 41 uses the envelope information $V_{org}(k,l)$ and $V_{tar}(k,l)$ to convert the spectrum X(k,l) of the reference speaker into a spectrum Y(k,l) of (the voice of) the target speaker in accordance with Equation (38).

$$Y(k,l) = \frac{V_{tar}(k,l)}{V_{org}(k,l)}X(k,l) \quad (38)$$

Thus, when the envelope conversion unit 41 calculates the spectrum Y(k,l) of the target speaker, the envelope conversion unit 41 supplies the spectrum Y(k,l) of the target speaker to the frequency time conversion unit 42.

<Frequency Time Conversion Unit 42>
The frequency time conversion unit 42 performs a frequency time conversion of the spectrum Y(k,l) of the target speaker from the envelope conversion unit 41 in accordance with Equations (39) and (40) and obtains an output frame signal y(n,l).

$$\tilde{Y}(k,l) = \begin{cases} Y(k,l) & k = 0, \ldots, \frac{M}{2} \\ conj(Y(M-k,l)) & k = \frac{M}{2}+1, \ldots, M-1 \end{cases} \quad (39)$$

$$\tilde{y}(n,l) = \frac{1}{M}\sum_{k=0}^{M-1} \tilde{Y}(k,l)\exp\left(i2\pi\frac{nk}{M}\right) \quad (40)$$

Herein, conj(x) represents inversing a symbol of an imaginary component of x.

Moreover, as a frequency time conversion of the frequency time conversion unit 42, an inverse conversion of a time frequency conversion of the time frequency conversion unit 31 can be adopted. In the present embodiment, since the DFT (Equation (4)) as with the time frequency conversion unit $21_z$ in FIG. 2 can be adopted as the time frequency conversion of the time frequency conversion unit 31, an Inverse Discrete Fourier Transform (IDFT) of an inverse conversion of the DFT (Equation (40)) can be adopted as the frequency time conversion of the frequency time conversion unit 42.

After obtaining the output frame signal y(n,l), the frequency time conversion unit 42 multiplies a window function $w_{syn}(n)$ in accordance with Equation (41) and then performs an overlap addition in accordance with Equation (42), thereby performing frame synthesis. Then, the frequency time conversion unit 42 outputs a voice (signal) $y^{curr}(n+lN)$ of the target speaker obtained as a result of the frame synthesis, as a result of a voice quality conversion (a result of the voice quality conversion of the voice of the reference speaker).

$$w_{syn}(n) = \begin{cases} \left(0.5 - 0.5\cos\left(2\pi\frac{n}{N}\right)\right)^{0.5} & n = 0, \ldots, N-1 \\ 0 & n = N, \ldots, M-1 \end{cases} \quad (41)$$

$$y^{curr}(n+lN) = y^\sim(n,l)w_{syn}(n) + y^{prev}(n+lN) \quad (42)$$

Herein, although both of $y^{curr}(n+lN)$ and $y^{prev}(n+lN)$ represent voices as a result of the voice quality conversion, $y^{prev}(n+lN)$ represents a voice as a result of the voice quality conversion up to immediately before the output frame signal y(n,l) which is a voice of the frame l, and $y^{curr}(n+lN)$ represents a voice as a result of the voice quality conversion up to the output frame signal y(n,l) which is the voice of the frame l.

Moreover, a window function $w_{syn}(n)$ in Equation (41) is the same window function as the window function $w_{ana}(n)$ in Equation (1) used for the time frequency conversion unit 31 (and the time frequency conversion unit 21$_z$). Alternatively, as the window function $w_{syn}(n)$, other window functions such as a Hamming window and a rectangular window can also be adopted.

<First to Third Determining Methods>

FIG. 5 is a diagram describing an overview of a first determining method among target speaker determining methods.

In the first determining method, the distribution of the speaker super-vector $S_z$ in each class #r that the speaker super-vector $S_{org}$ of the reference speaker belongs to (shown by a dotted line in FIG. 5) is randomly sampled, and the speaker super-vector S corresponding to the sampling point obtained as a result of the sampling is determined as the speaker super-vector $S_{tar}$ of the target speaker.

Therefore, according to the first determining method, the distribution of the speaker super-vector of each speaker that exists in the utterance situation of the voice of the reference speaker is unlikely to change significantly by the voice quality conversion.

That is, the speaker super-vector $S_{tar}$ of the target speaker is sampled from within the distribution of the speaker super-vector $S_z$ in each class #r that the speaker super-vector $S_{org}$ of the reference speaker belongs to, so that an atmosphere of the utterance situation of the voice of the reference speaker is stored in a case of the voice quality conversion performed by using the speaker super-vector $S_{tar}$ of the target speaker.

Therefore, according to the first determining method, the voice quality conversion for erasing the voice personality can be performed without impairing the atmosphere of the utterance situation of the voice of the reference speaker.

Figure 6:
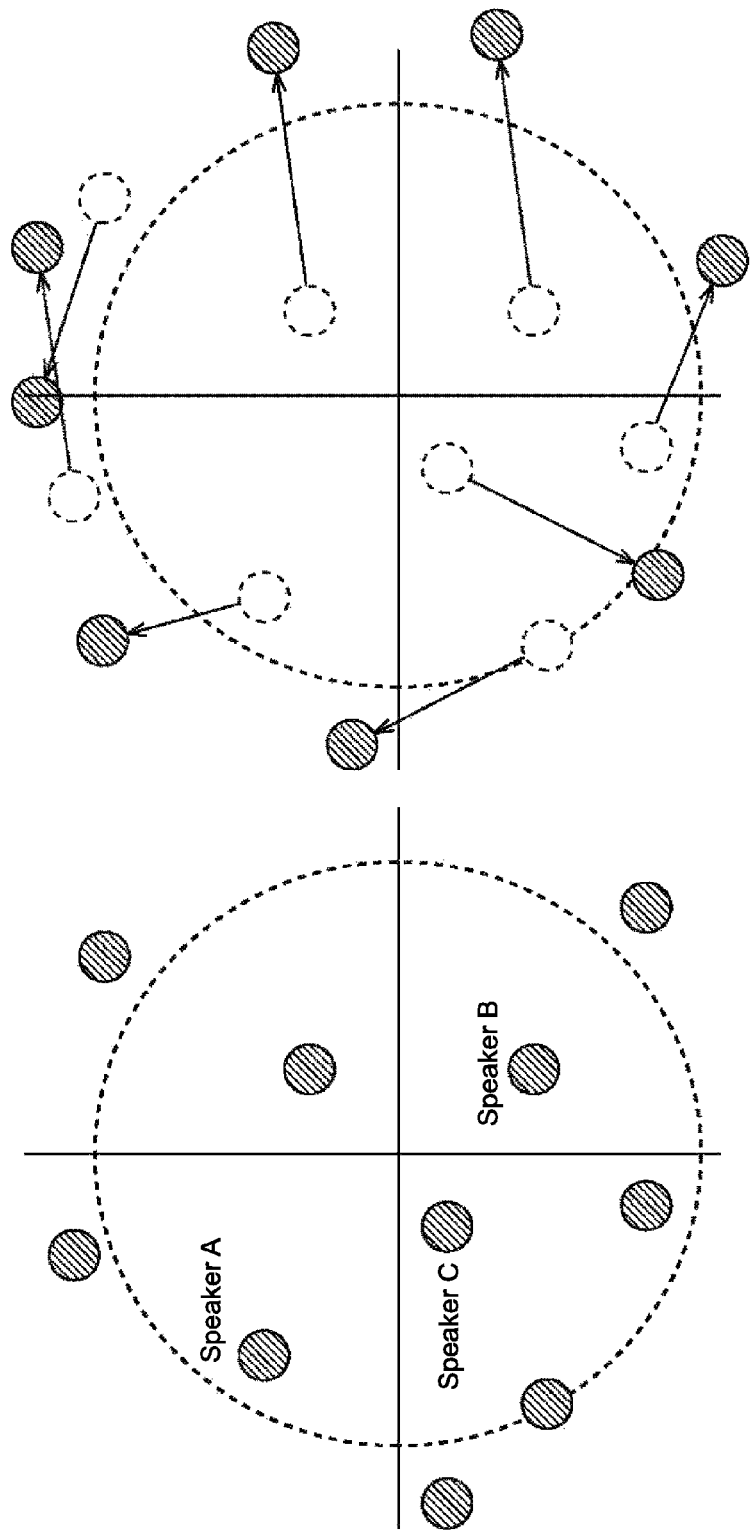
FIG. 6 is a diagram describing an overview of a second determining method among the target speaker determining methods.

FIG. 6 is a diagram describing an overview of a second determining method among the target speaker determining methods.

In the second determining method, the distribution of the speaker super-vector $S_z$ in each class #r' different from the distribution of the speaker super-vector $S_z$ in each class #r that the speaker super-vector $S_{org}$ of the reference speaker belongs to (shown by a dotted line in FIG. 6) is randomly sampled, and the speaker super-vector S corresponding to the sampling point obtained as a result of the sampling is determined as the speaker super-vector $S_{tar}$ of the target speaker.

Therefore, in the second determining method, the speaker super-vector $S_{tar}$ of the target speaker is sampled from the outside of the distribution of the speaker super-vector $S_z$ in each class #r that the speaker super-vector $S_{org}$ of the reference speaker belongs to, so that an atmosphere of the utterance situation of the voice of the reference speaker is impaired, and then the voice after the voice quality conversion is significantly different from the voice quality of the reference speaker in a case of the voice quality conversion performed by using the speaker super-vector $S_{tar}$ of the target speaker.

Thus, according to the second determining method, it is possible to perform the voice quality conversion for strongly erasing the voice personality of the reference speaker without storing the atmosphere of the utterance situation of the voice of the reference speaker.

Figure 7:
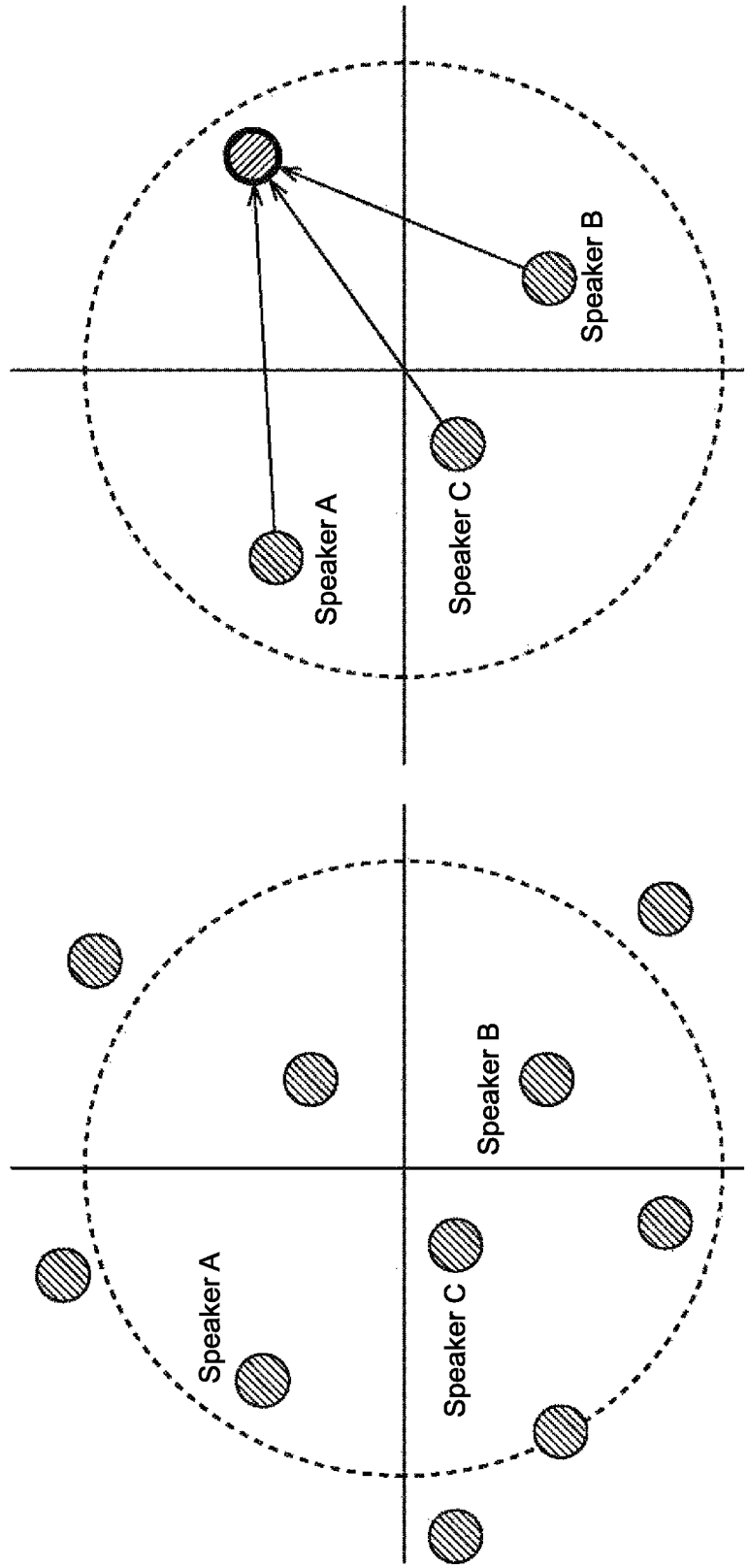
FIG. 7 is a diagram describing an overview of a voice quality conversion which can be carried out by the first determining method.

FIG. 7 is a diagram describing an overview of a voice quality conversion which can be carried out by the first determining method.

In the first determining method, the distribution of the speaker super-vector $S_z$ in each class #r that the speaker super-vector $S_{org}$ of the reference speaker belongs to (shown by a dotted line in FIG. 7) is randomly sampled, and the speaker super-vector S corresponding to the sampling point obtained as a result of the sampling is determined as the speaker super-vector $S_r$, of the target speaker, so that the speaker having the same voice quality (or a similar voice quality) may be determined as the target speaker with respect to a plurality of speakers.

In the case, it may be difficult to distinguish the voices of the plurality of speakers after the voice quality conversion.

Thus, according to the third determining method, it is possible to prevent the speaker having the same voice quality from being determined as the target speaker with respect to the plurality of speakers.

Figure 8:
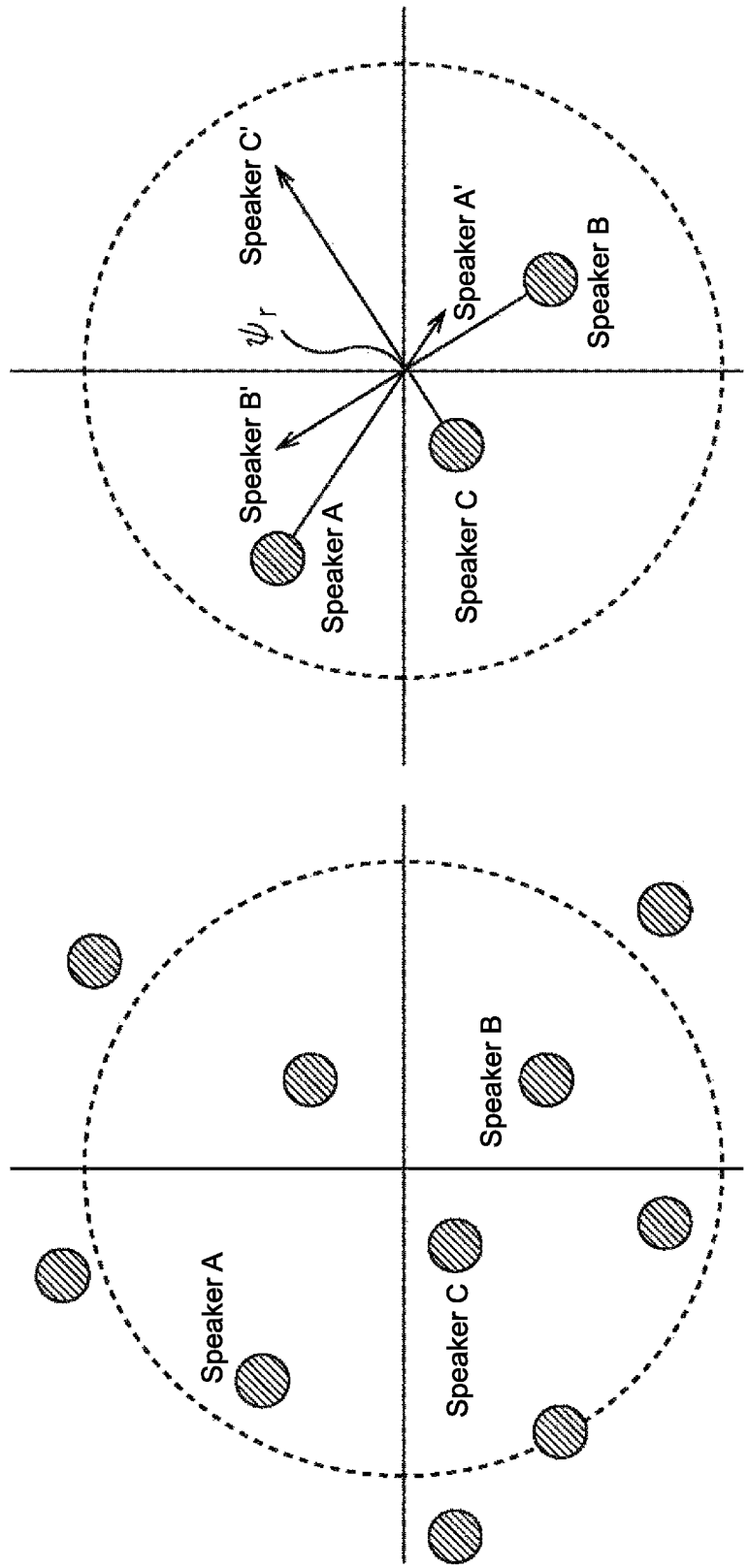
FIG. 8 is a diagram describing an overview of a third determining method among the target speaker determining methods.

FIG. 8 is a diagram describing an overview of a third determining method among the target speaker determining methods.

In the third determining method, in the distribution of the speaker super-vector $S_z$ in each class #r that the speaker super-vector $S_{org}$ of the reference speaker belongs to (shown by a dotted line in FIG. 8), the speaker super-vector S corresponding to a point which is located in a point symmetry direction with respect to the mean value $\psi_r$ of the distribution of the speaker super-vector $S_z$ in each class #r viewing from the speaker super-vector $S_{org}$ of the reference speaker and which is located at a distance Dr determined from the speaker super-vector $S_{org}$ of the reference speaker by the covariance $\phi_r$ of the distribution of the speaker super-vector $S_z$ in each class #r is determined as the speaker super-vector $S_{tar}$ of the target speaker.

Thus, in the third determining method, in the distribution of the speaker super-vector $S_z$ in each class #r that the speaker super-vector $S_{org}$ of the reference speaker belongs to, the speaker super-vector S corresponding to a point where the speaker super-vector $S_{org}$ of the reference speaker is shifted by a distance Dr toward the mean value $\psi_r$ is determined as the speaker super-vector $S_{tar}$ of the target speaker, so that the voice quality conversion for strongly erasing the voice personality can be performed without impairing the atmosphere of the utterance situation of the voice of the reference speaker.

Further, in the third determining method, regarding the plurality of reference speakers, as long as the voice quality of the reference speakers is different, the speaker having the different voice quality is determined as the target speaker. Therefore, it is possible to prevent the speaker having the same voice quality from being determined as the target speaker with respect to the plurality of speakers.

Thus, since the voice quality conversion unit 12 determines the target speaker determining method used for the voice quality conversion in accordance with the determining method control value w and determines the target speaker in accordance with the target speaker determining method, it is possible for the user to easily perform the voice quality conversion the user desires only by instructing the determining method control value w without instructing the target speaker.

<Process of Voice Quality Conversion Unit 12>

Figure 9:
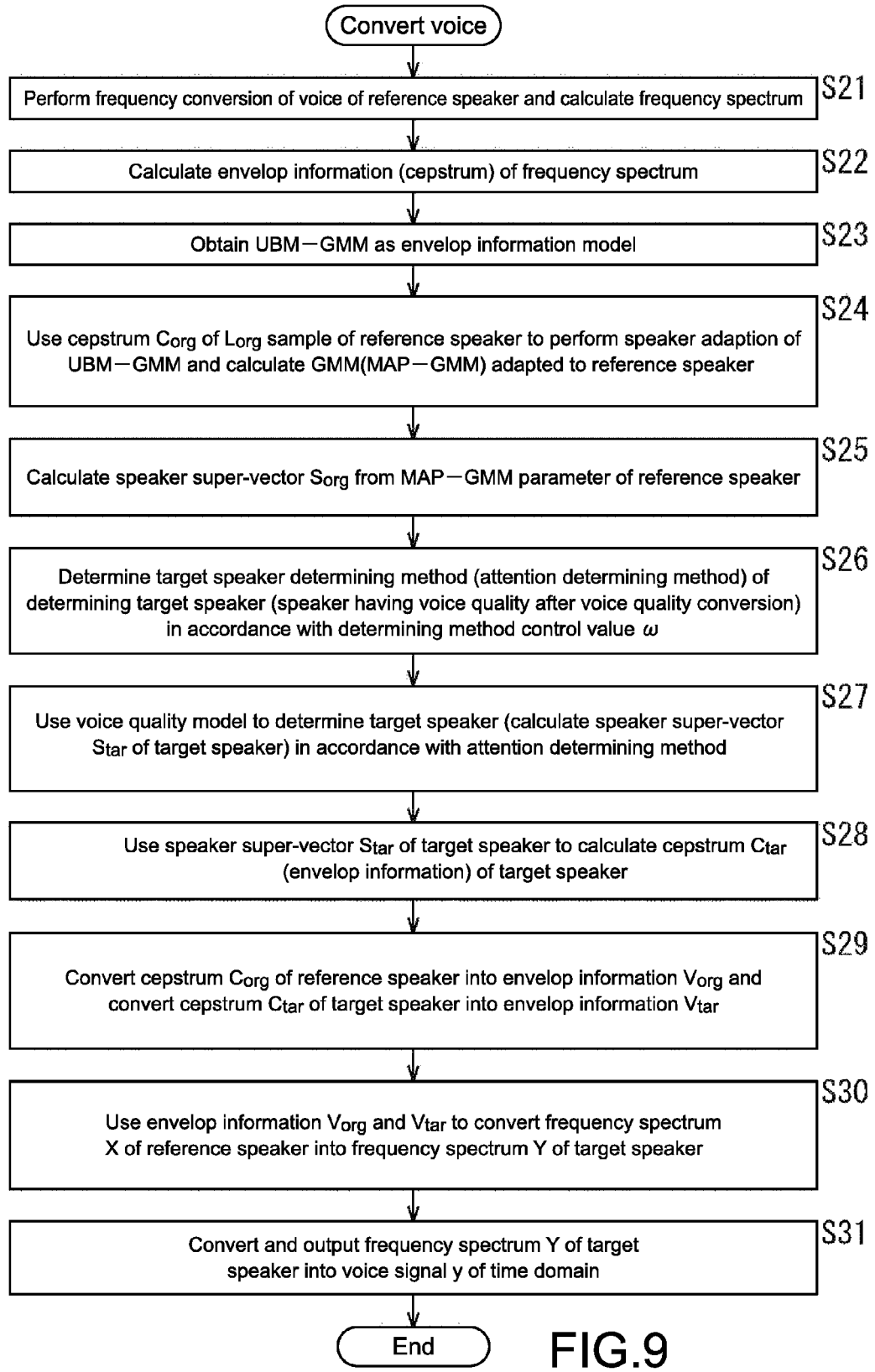
FIG. 9 is a flowchart describing a process of a voice quality conversion carried out by the voice quality conversion unit.

FIG. 9 is a flowchart describing a process of a voice quality conversion carried out by the voice quality conversion unit 12 in FIG. 4.

When the voice quality conversion unit 12 receives the voice of the reference speaker and the determining method control value w, the voice quality conversion unit 12 supplies the voice of the reference speaker to the time frequency conversion unit 31 and supplies the determining method control value w to the voice quality determining unit 34.

Then, in step S21, the time frequency conversion unit 31 converts the frequency of the voice of the reference speaker as with the time frequency conversion unit $21_z$ in FIG. 2, and supplies the resulting spectrum X(k,l) to the envelope calculating unit 32 and the voice generating unit 35, and then the process proceeds to step S22.

In step S22, the envelope calculating unit 32 calculates the cepstrum C(j,l) as envelope information of the reference speaker from the spectrum X(k,l) out of the time frequency conversion unit 31 as with the envelope calculating unit $22_z$ in FIG. 2 and supplies it to the speaker adapting unit 33, and then the process proceeds to step S23.

In step S23, the speaker adapting unit 33 receives (model parameter $\theta'_p = \{\mu'_p, \Sigma'_p, \pi'_p\}$ of) the UBM-GMM as the envelop information model from the envelope space generating unit 24 of the learning unit 11 (FIG. 2), and the process proceeds to step S24.

In step S24, the speaker adapting unit 33 uses the reference speaker cepstrum $C_{org}(j,l)$ from the envelope calculating unit 32 as with the speaker adapting unit $25_z$ in FIG. 2 to perform the speaker adaption of the UBM-GMM from the learning unit 11, thereby generating the MAP-GMM adapted to the reference speaker. Then, the process proceeds to step S25.

In step S25, the speaker adapting unit 33 uses the mean vector $\mu_{org,p}$ which is the model parameter of the MAP-GMM adapted to the reference speaker as with the speaker adapting unit $25_z$ in FIG. 2 to generate, as a voice quality parameter representing the voice quality of the reference speaker, a speaker super-vector $S_{org} = [\mu_{org,0}^T, \mu_{org,1}^T, \ldots, \mu_{org,P-1}^T]^T$ for setting, as a component, mean vectors $\mu_{org,0}, \mu_{org,1}, \ldots, \mu_{org,P-1}$ of the P Gaussian distribution constituting the MAP-GMM, and supplies it to the voice quality determining unit 34 together with the reference speaker cepstrum $C_{org}(j,l)$ from the envelope calculating unit 32. Then, the process proceeds to step S26.

In step S26, the voice quality determining unit 34 receives the determining method control value w supplied from outside and determines, as the attention determining method, the target speaker determining method used for the voice quality conversion, for example, among the above described first to third determining methods in accordance with the determining method control value w. Then, the process proceeds to step S27.

It should be noted that when the determining method control value w is not supplied from outside, the voice quality determining unit 34 can use a predetermined default value as the determining method control value w, for example.

In step S27, the voice quality determining unit 34 uses the mean value $\psi_r$ and the covariance $\phi_r$ of the speaker super-vector $S_z$ in each class #r as the voice quality model stored in the voice quality model database 27 of the learning unit 11 (FIG. 2) as well as the speaker super-vector $S_{org}$ as a voice quality parameter of the reference speaker supplied from the speaker adapting unit 33 to determine (calculate) the speaker super-vector $S_{tar}$ as a voice quality parameter of the target speaker in accordance with the attention determining method. Then, the process proceeds to step S28.

In step S28, the voice quality determining unit 34 calculates the target speaker cepstrum $C_{tar}(j,l)$ which is the cepstrum as envelope information of the target speaker from the speaker super-vector $S_{tar}$ as a voice quality parameter of the target speaker in accordance with Equations (29) to (35) and supplies it to the envelope conversion unit 41 of the voice generating unit 35 together with the reference speaker cepstrum $C_{org}(j,l)$ from the speaker adapting unit 33. Then, the process proceeds to step S29.

In step S29, the envelope conversion unit 41 converts the target speaker cepstrum $C_{tar}(j,l)$ and the reference speaker cepstrum $C_{org}(j,l)$ from the voice quality determining unit 34 into envelope information $V_{tar}(k,l)$ and $V_{org}(k,l)$ on the frequency domain in accordance with Equations (36) and (37), and then the process proceeds to step S30.

In step S30, the envelope conversion unit 41 uses the envelope information $V_{tar}(k,l)$ and $V_{org}(k,l)$ to convert the spectrum X(k,l) of the reference speaker from the voice quality determining unit 34 into a spectrum Y(k,l) of (the voice of) the target speaker in accordance with Equation (38) and supplies it to the frequency time conversion unit 42, and then the process proceeds to step S31.

In step S31, the frequency time conversion unit 42 performs the frequency time conversion of the spectrum Y(k,l) of the target speaker from the envelope conversion unit 41 in accordance with Equations (39) to (42) and outputs a voice (signal) $y^{curr}(n+lN)$ of the target speaker obtained as a result, that is, a result of a voice quality conversion of the voice of the reference speaker.

<Application to Server Client System>

FIG. 10 is a diagram describing the voice personality erasing apparatus applied to a server client system.

The voice personality erasing apparatus in FIG. 1 may be not only configured as a so-called stand-along apparatus but also configured as a server client system.

Figure 10A:
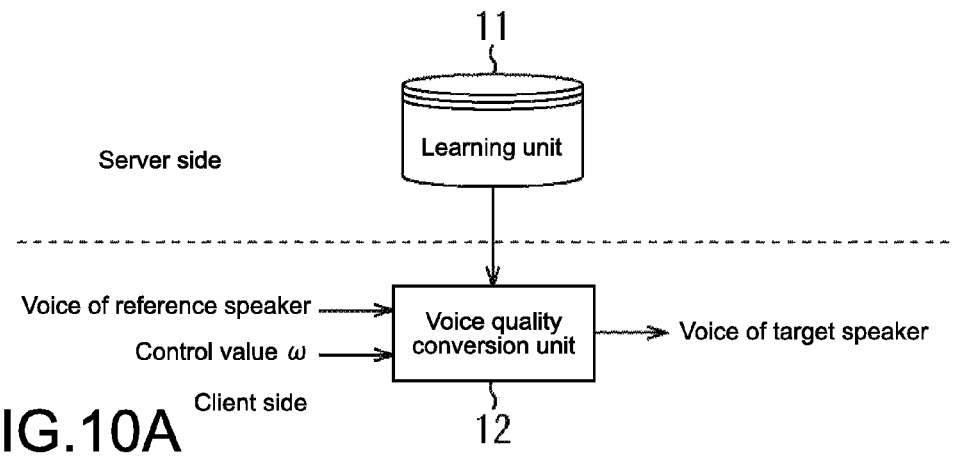
FIGS. 10A, 10B, and 10C are diagrams each describing a voice personality erasing apparatus applied to a server client system.

FIG. 10A is a block diagram showing a first configuration example of the server client system to which the voice personality erasing apparatus is applied.

In FIG. 10A, the server includes the learning unit 11, and the client includes the voice quality conversion unit 12.

The voice quality conversion unit 12 as the client performs a voice conversion by obtaining necessary information of a voice quality model and the like from the learning unit 11 as the server.

Figure 10B:
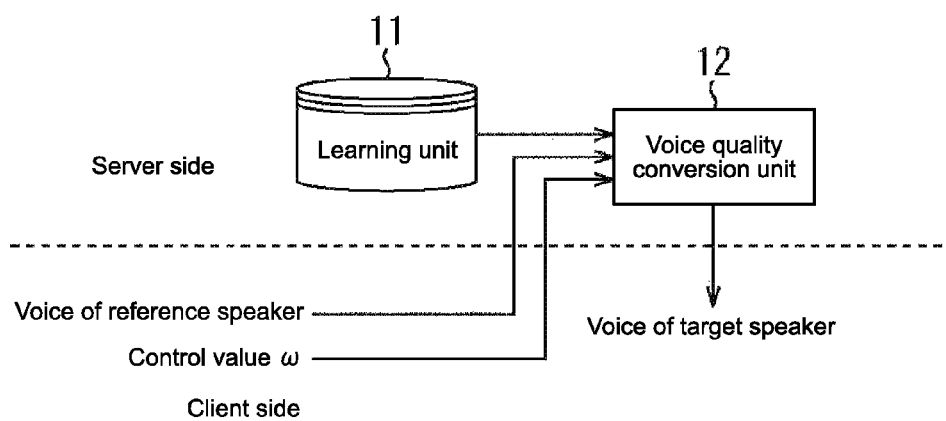

FIG. 10B is a block diagram showing a second configuration example of the server client system to which the voice personality erasing apparatus is applied.

In FIG. 10B, the server includes the learning unit 11 and the voice quality conversion unit 12, and the client includes a user interface (I/F) (not shown).

In the client, the user inputs the voice of the reference speaker and the determining method control value w from the user I/F and transmits it to the server.

In the server, the voice of the reference speaker and the determining method control value w from the client, and the necessary information of the voice quality model and the like obtained from the learning unit 11 are used to perform the voice quality conversion, and a voice as a result of the voice quality conversion is transited to the client.

In the client, the voice as a result of the voice quality conversion from the server is received and is outputted from the user I/F.

Figure 10C:
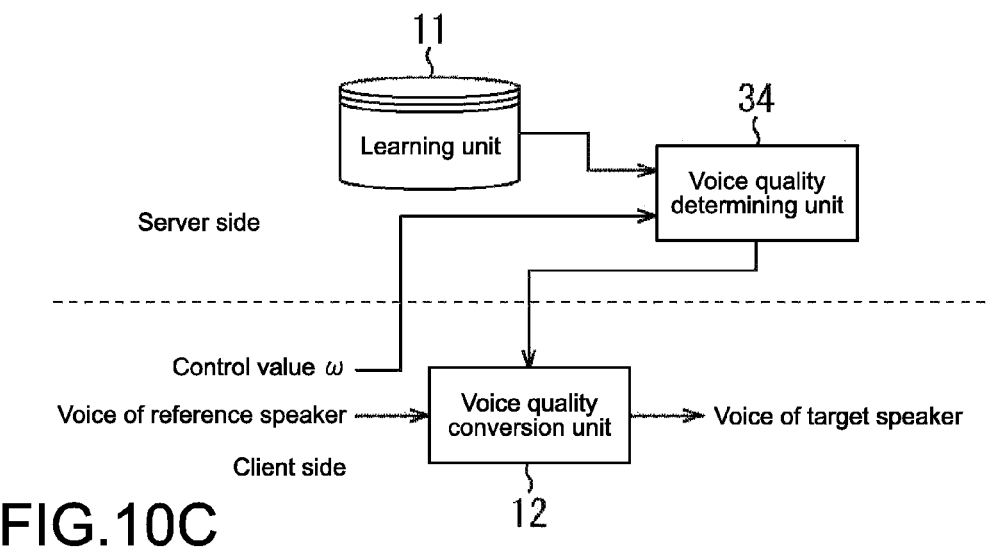

FIG. 10C is a block diagram showing a third configuration example of the server client system to which the voice personality erasing apparatus is applied.

In FIG. 10C, the server includes the learning unit 11 and the voice quality determining unit 34 as a part of the voice quality conversion unit 12, and the client includes the remainder (the time frequency conversion unit 31, the envelope calculating unit 32, the speaker adapting unit 33, and the voice generating unit 35 in FIG. 4) of the voice quality conversion unit 12.

In the client, the determining method control value w is transmitted to the server. In the server, the voice quality determining unit 34 uses the determining method control value w from the client and the necessary information of the voice quality model and the like obtained from the learning unit 11 to perform the same process described above. The resulting information is transmitted to the client.

In the client, the voice quality conversion unit 12 uses the voice of the reference speaker and information obtained by the voice quality determining unit 34 transmitted from the server to perform the process that excludes the process performed by the voice quality determining unit 34 among the processes of the voice quality conversion unit 12 described in FIG. 9.

It should be noted that when the voice personality erasing apparatus is applied to the client server system, blocks other than the voice quality determining unit 34 among blocks constituting the voice quality conversion unit 12 can be applied to the server.

<Description of Computer to which the Present Technology is Applied>

Next, the above described series of processes may be performed by hardware or software. When a series of processes is performed by the software, a program constituting the software is installed in a general purpose computer or the like.

Figure 11:
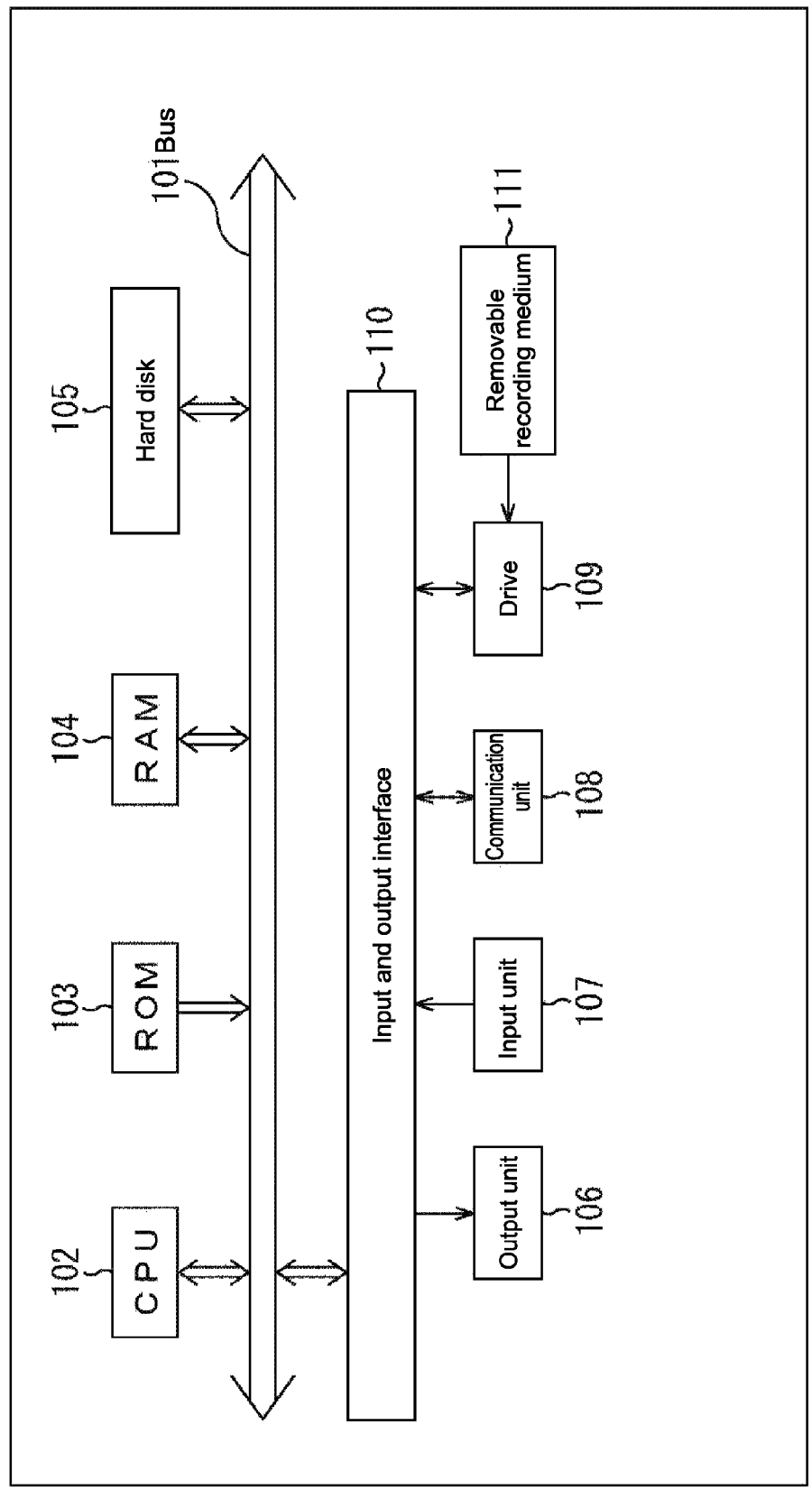
FIG. 11 is a block diagram showing a configuration example according to an embodiment of a computer to which the present technology is applied.

Therefore, FIG. 11 shows a configuration example of the computer in which the program for executing the above described series of processes is installed.

The program may be previously recorded on a hard disk 105 or a Read Only Memory (ROM) 103 which is a recording medium embedded in the computer.

Alternatively, the program may be stored (recorded) on a removable recording medium 111. The removable recording medium 111 may be provided as so-called package software. Herein, the removable recording medium 111 includes, for example, a flexible disc, a Compact Disc Read Only Memory (CD-ROM), a Magneto Optical (MO) disc, a Digital Versatile Disc (DVD), a magnetic disk, a semiconductor memory, and the like.

It should be noted that the program may be installed onto the computer from the removable recording medium 111 as described above, and further may be downloaded to the computer via a communication network or a broadcasting network and installed in the built-in hard disk 105. That is, the program may be transmitted to the computer, for example, in a wireless manner, from a download site via an artificial satellite for digital satellite broadcasting, or may be transmitted to the computer in a wired manner via a network such as a Local Area Network (LAN) or the Internet.

The computer has a Central Processing Unit (CPU) 102 embedded therein, and the CPU 102 is connected to an input and output interface 110 via a bus 101.

When a command is input by a user via the input and output interface 110 through an operation of an input unit 107 or the like, the CPU 102 executes a program stored in a Read Only Memory (ROM) 103 in response thereto. Alternatively, the CPU 102 loads a program stored in the hard disk 105 to a Random Access Memory (RAM) 104 so as to be executed.

Therefore, the CPU 102 performs the process in accordance with the above described flowchart or the process performed by the above described configuration of the block diagram. Then, the CPU 102 outputs or transmits the processed result from an output unit 106 or a communication unit 108 via, for example, the input and output interface 110, or records the result on the hard disk 105, as necessary.

In addition, the input unit 107 includes a keyboard, a mouse, a microphone, or the like. Moreover, the output unit 106 includes a Liquid Crystal Display (LCD), a speaker, or the like.

Herein, in the present specification, a process performed by the computer in accordance with the program is not necessarily performed in a time series in accordance with an order described as a flowchart. In other words, the process performed by the computer in accordance with the program also includes a process (for example, a parallel process or a process using objects) performed in parallel or separately.

Moreover, the program may be processed by a single computer (processor) or may be processed so as to be distributed by a plurality of computers. Further, the program may be transmitted to a remote computer and be executed.

Further, in the present specification, the system indicates an assembly of a plurality of constituent elements (apparatuses, modules (components), or the like), and whether or not all the constituent elements are in the same casing is not important. Therefore, both a plurality of apparatuses which are accommodated in separate casings and are connected to each other via a network, and a single apparatus where a plurality of modules are accommodated in a single casing are a system.

It should be noted that embodiments of the present technology are not limited to the above described embodiments but may have various modifications without departing from the scope of the present technology.

For example, the present technology may employ cloud computing where a single function is distributed to a plurality of apparatuses via a network and is processed in cooperation.

Moreover, each step described in the above flowchart may be not only executed by a single apparatus, but may be also distributed to a plurality of apparatuses and be executed.

Further, in a case where a single step includes a plurality of processes, a plurality of processes included in the step may be not only executed by a single apparatus, but may be also distributed to a plurality of apparatuses and be executed.

Moreover, the effects described in the present specification are merely exemplary and not limited, and may have other effects.

Herein, although the case where the present technology is applied to the voice quality conversion for erasing the voice personality is described in the present embodiments, the present technology can be adopted to a voice quality conversion for purposes other than erasing the voice personality.

Moreover, in the present embodiments, the determining method control value w takes one of three values 0, 1, and 2, and the target speaker determining method used for the voice quality conversion is determined among the first and second determining methods in accordance with the determining method control value w. However, the determining method control value w is not limited to the three values, and the target speaker determining method is not limited to the first and second determining methods. That is, two values or four values or more can be adopted as the determining method control value w, and two methods or four methods or more can be prepared as the target speaker determining method.

Further, the voice quality conversion method is not limited to the above described methods.

It should be noted that the present technology may have the following configurations:

<1> A voice processing apparatus, including a voice quality determining unit configured to determine a target speaker determining method used for a voice quality conversion in accordance with a determining method control value for instructing the target speaker determining method of determining a target speaker whose voice quality is targeted to the voice quality conversion, and determine the target speaker in accordance with the target speaker determining method.

<2> The voice processing apparatus according to Item <1>, further including a voice generating unit configured to generate a voice of the voice quality of the target speaker from a voice of a reference speaker whose voice quality is to be converted.

<3> The voice processing apparatus according to Item <2>, in which the voice quality determining unit is configured to determine the target speaker by using a voice quality parameter distribution which is a distribution of a voice quality parameter calculated by using a plurality of speakers' voices in a voice quality space of the voice quality parameter for representing the voice quality.

<4> The voice processing apparatus according to Item <3>, in which the voice quality determining unit is configured to determine, as the target speaker determining method used for the voice quality conversion, a method of determining, as the target speaker's voice quality, the voice quality represented by the voice quality parameter distributed in the voice quality parameter distribution that the reference speaker's voice quality parameter belongs to in accordance with the determining method control value.

<5> The voice processing apparatus according to Item <4>, in which the voice quality determining unit is configured to determine, as the target speaker determining method used for the voice quality conversion, a method of randomly sampling the voice quality parameter distribution that the reference speaker's voice quality parameter belongs to and determining, as the target speaker's voice quality, the voice quality represented by the voice quality parameter corresponding to a sampling point obtained as a result of the sampling in accordance with the determining method control value.

<6> The voice processing apparatus according to Item <4> or <5>, in which the voice quality determining unit is configured to determine, as the target speaker determining method used for the voice quality conversion, a method of determining, as the target speaker's voice quality, the voice quality represented by the voice quality parameter corresponding to a point where a point corresponding to the reference speaker's voice quality parameter in the voice quality parameter distribution that the reference speaker's voice quality parameter belongs to is shifted in a point symmetry direction with respect to a predetermined point in accordance with the determining method control value.

<7> The voice processing apparatus according to Item <3>, in which the voice quality determining unit is configured to determine, as the target speaker determining method used for the voice quality conversion, a method of determining, as the target speaker's voice quality, the voice quality represented by the voice quality parameter distributed in the voice quality parameter distribution different from the voice quality parameter distribution that the reference speaker's voice quality parameter belongs to in accordance with the determining method control value.

<8> The voice processing apparatus according to Item <3>, in which the voice quality determining unit is configured to determine, as the target speaker determining method used for the voice quality conversion, one of a method of using the voice quality parameter distribution which is the distribution of the voice quality parameter calculated by using the plurality of speakers' voices in the voice quality space of the voice quality parameter for representing the voice quality, and a method of using the voice quality parameter distribution different from the voice quality parameter distribution that the reference speaker's voice quality parameter belongs to in accordance with the determining method control value.

<9> The voice processing apparatus according to Item <3>, in which the voice quality determining unit is configured to determine, as the target speaker determining method used for the voice quality conversion, one of a method of randomly sampling the voice quality parameter distribution that the reference speaker's voice quality parameter belongs to and determining, as the target speaker's voice quality, the voice quality represented by the voice quality parameter corresponding to a sampling point obtained as a result of the sampling, a method of determining, as the target speaker's voice quality, the voice quality represented by the voice quality parameter corresponding to a point where a point corresponding to the reference speaker's voice quality parameter in the voice quality parameter distribution that the reference speaker's voice quality parameter belongs to is shifted in a point symmetry direction with respect to a predetermined point, and a method of determining, as the target speaker's voice quality, the voice quality represented by the voice quality parameter distributed in the voice quality parameter distribution different from the voice quality parameter distribution that the reference speaker's voice quality parameter belongs to in accordance with the determining method control value.

<10> A voice processing method, including: determining a target speaker determining method used for a voice quality conversion in accordance with a determining method control value for instructing the target speaker determining method of determining a target speaker whose voice quality is targeted to the voice quality conversion; and determining the target speaker in accordance with the target speaker determining method.

<11> A program that causes a computer to function as: a voice quality determining unit configured to determine a target speaker determining method used for a voice quality conversion in accordance with a determining method control value for instructing the target speaker determining method of determining a target speaker whose voice quality is targeted to the voice quality conversion, and determine the target speaker in accordance with the target speaker determining method.

It should be understood by those skilled in the art that various modifications, combinations, sub-combinations and alterations may occur depending on design requirements and other factors insofar as they are within the scope of the appended claims or the equivalents thereof.

What is claimed is:

1. A voice processing apparatus for voice quality conversion, comprising:
one or more processors configured to:
determine a target speaker determining method used for the voice quality conversion based on a determining method control value to instruct the target speaker determining method that determines a target speaker whose voice quality is targeted to the voice quality conversion;
determine the target speaker based on the target speaker determining method for a voice of a reference speaker whose voice quality is to be converted;
determine, as the target speaker determining method, a method that randomly samples a voice quality parameter distribution that a voice quality parameter of the reference speaker belongs to, wherein the voice quality parameter distribution is a distribution of a voice quality parameter calculated based on voices of a plurality of speakers in a voice quality space of the voice quality parameter to represent the voice quality;
determine, as the voice quality of the target speaker, the voice quality represented by the voice quality parameter that corresponds to a sampling point obtained as a result of the sampling based on the determining method control value; and
convert the voice quality of the voice of the reference speaker to a voice of the target speaker based on the determined method.

2. The voice processing apparatus according to claim 1, wherein the one or more processors are further configured to generate the voice of the voice quality of the target speaker from the voice of the reference speaker.

3. The voice processing apparatus according to claim 1, wherein the one or more processors are further configured to determine the target speaker based on the voice quality parameter distribution.

4. The voice processing apparatus according to claim 1, wherein the one or more processors are further configured to determine, as the target speaker determining method used for the voice quality conversion, a method that determines, as the voice quality of the target speaker, the voice quality represented by the voice quality parameter distributed in the voice quality parameter distribution that the voice quality parameter of the reference speaker belongs to, based on the determining method control value.

5. The voice processing apparatus according to claim 1, wherein the one or more processors are further configured to determine, as the target speaker determining method used for the voice quality conversion, a method that determines, as the voice quality of the target speaker, the voice quality represented by the voice quality parameter that corresponds to a point where a point that corresponds to the voice quality parameter of the reference speaker in the voice quality parameter distribution that the voice quality parameter of the reference speaker belongs to, is shifted in a point symmetry direction with respect to a determined point based on the determining method control value.

6. The voice processing apparatus according to claim 1, wherein the one or more processors are further configured to determine, as the target speaker determining method used for the voice quality conversion, a method that determines, as the voice quality of the target speaker, the voice quality represented by the voice quality parameter distributed in the voice quality parameter distribution different from the voice quality parameter distribution that the voice quality parameter of the reference speaker belongs to, based on the determining method control value.

7. The voice processing apparatus according to claim 1, wherein the one or more processors are further configured to determine, as the target speaker determining method used for the voice quality conversion, one of:
a method that utilizes the voice quality parameter distribution which is the distribution of the voice quality parameter calculated based on the voices of the plurality of speakers in the voice quality space of the voice quality parameter to represent the voice quality, or
a method that utilizes the voice quality parameter distribution different from the voice quality parameter distribution that the voice quality parameter of the reference speaker belongs to, based on the determining method control value.

8. The voice processing apparatus according to claim 1, wherein the one or more processors are further configured to determine, as the target speaker determining method used for the voice quality conversion, one of:
the method that randomly samples the voice quality parameter distribution that the voice quality parameter of the reference speaker belongs to and determine, as the voice quality of the target speaker, the voice quality represented by the voice quality parameter that corresponds to the sampling point obtained as the result of the sampling,
a method that determines, as the voice quality of the target speaker, the voice quality represented by the voice quality parameter that corresponds to a point where a point that corresponds to the voice quality parameter of the reference speaker in the voice quality parameter distribution that the voice quality parameter of the reference speaker belongs to, is shifted in a point symmetry direction with respect to a determined point, or
a method that determines, as the voice quality of the target speaker, the voice quality represented by the voice quality parameter distributed in the voice quality parameter distribution different from the voice quality parameter distribution that the voice quality parameter of the reference speaker belongs to, based on the determining method control value.

9. The voice processing apparatus according to claim 1, wherein the one or more processors are further configured to execute the voice quality conversion based on the determined target speaker.

10. A voice processing method for voice quality conversion, the method comprising:
determining, by one or more processors, a target speaker determining method used for the voice quality conversion based on a determining method control value for instructing the target speaker determining method of determining a target speaker whose voice quality is targeted to the voice quality conversion;
determining, by the one or more processors, the target speaker based on the target speaker determining method for a voice of a reference speaker whose voice quality is to be converted;

determining, as the target speaker determining method, a method of randomly sampling a voice quality parameter distribution that a voice quality parameter of the reference speaker belongs to, wherein the voice quality parameter distribution is a distribution of a voice quality parameter calculated based on voices of a plurality of speakers in a voice quality space of the voice quality parameter to represent the voice quality;

determining, as the voice quality of the target speaker, the voice quality represented by the voice quality parameter that corresponds to a sampling point obtained as a result of the sampling based on the determining method control value; and converting, by the one or more processors, the voice quality of the voice of the reference speaker to a voice of the target speaker based on the determined method.

11. A non-transitory computer-readable medium having stored thereon computer-readable instructions, which when executed by a computer, cause the computer to execute operations, the operations comprising:

determining a target speaker determining method used for voice quality conversion based on a determining method control value for instructing the target speaker determining method of determining a target speaker whose voice quality is targeted to the voice quality conversion;

determining the target speaker based on the target speaker determining method for a voice of a reference speaker whose voice quality is to be converted;

determining, as the target speaker determining method, a method of randomly sampling a voice quality parameter distribution that a voice quality parameter of the reference speaker belongs to, wherein the voice quality parameter distribution is a distribution of a voice quality parameter calculated based on voices of a plurality of speakers in a voice quality space of the voice quality parameter to represent the voice quality;

determining, as the voice quality of the target speaker, the voice quality represented by the voice quality parameter that corresponds to a sampling point obtained as a result of the sampling based on the determining method control value; and converting the voice quality of the voice of the reference speaker to a voice of the target speaker based on the determined method.

* * * * *